United States Patent
Kim et al.

(10) Patent No.: US 9,700,826 B2
(45) Date of Patent: Jul. 11, 2017

(54) VENTURI SPRINKLER AND APPARATUS FOR CONTROLLING SMOKE GENERATED BY FIRE

(71) Applicants: Sung Woo Kim, Goyang-si (KR); Myung Min Kim, Goyang-si (KR); Myung Ah Kim, Goyang-si (KR)

(72) Inventors: Sung Woo Kim, Goyang-si (KR); Myung Min Kim, Goyang-si (KR); Myung Ah Kim, Goyang-si (KR)

(*) Notice: Subject to any disclaimer, the term of this patent is extended or adjusted under 35 U.S.C. 154(b) by 290 days.

(21) Appl. No.: 14/369,025

(22) PCT Filed: Dec. 26, 2012

(86) PCT No.: PCT/KR2012/011514
§ 371 (c)(1),
(2) Date: Jun. 26, 2014

(87) PCT Pub. No.: WO2013/100599
PCT Pub. Date: Jul. 4, 2013

(65) Prior Publication Data
US 2014/0352698 A1    Dec. 4, 2014

(30) Foreign Application Priority Data

Dec. 27, 2011 (KR) .................. 10-2011-0143719
Jun. 28, 2012 (KR) .................. 10-2012-0070038

(51) Int. Cl.
  *A62C 35/00* (2006.01)
  *B01D 47/06* (2006.01)
  (Continued)

(52) U.S. Cl.
  CPC .............. *B01D 47/06* (2013.01); *A62B 23/02* (2013.01); *A62C 31/02* (2013.01); *A62C 33/00* (2013.01);
  (Continued)

(58) Field of Classification Search
  CPC ..... A62C 2/243; A62C 99/0072; A62C 31/02; A62C 35/68; B05B 1/3415; B05B 7/0425;
  (Continued)

(56) References Cited

U.S. PATENT DOCUMENTS 3,407,880 A * 10/1968 Davis .................. A62C 5/006
                                                 169/12
3,692,118 A *  9/1972 Yao ..................... A62C 99/009
                                                 169/12
(Continued)

FOREIGN PATENT DOCUMENTS

CN         2044882 U     9/1989
CN       201260650 Y     6/2009
(Continued)

OTHER PUBLICATIONS

Korean Intellectual Property Office, Communication issued in counterpart KR 10-2012-0070038, dated Jun. 25, 2013.
(Continued)

*Primary Examiner* — Arthur O Hall
*Assistant Examiner* — Viet Le
(74) *Attorney, Agent, or Firm* — Sughrue Mion, PLLC

(57) ABSTRACT

Provided is an apparatus for removing smoke and poisonous gas. The apparatus includes a body configured to include a flux unit which supplies water and a nozzle which is connected to the flux unit and has a narrower width than the flux unit, a frame configured to surround the body and include a suction part for removing smoke, and a heat sensitive unit fixed to seal the nozzle. When the flux unit, nozzle and frame sprays fluid with a certain pressure at high speed through the nozzle, pressure energy of the fluid is changed to velocity energy, and a vacuum state is formed in a suction room at a low pressure due to a fast speed. In order (Continued)

for an operation to be performed as a vacuum ejector for sucking another fluid, the suction part is positioned surrounding the nozzle, and the frame is provided to surround the heat sensitive unit. A negative pressure explained in Bernoulli's theorem is generated to form a vacuum in the space between the nozzle and the mixing chamber, thus enabling the suction of smoke and poisonous gas. The smoke and poisonous gas are mixed with water in the mixing chamber so as to be trapped in the water or dissolved and dispersed in the water. The suction part is formed in the area which encloses the nozzle such that the suction part can operate together with a vacuum ejector. The frame is arranged so as to enclose the heat sensitive unit.

21 Claims, 45 Drawing Sheets

(51) Int. Cl.
B05B 7/04 (2006.01)
B01F 5/04 (2006.01)
B01F 3/04 (2006.01)
A62B 23/02 (2006.01)
A62C 33/00 (2006.01)
B01D 47/10 (2006.01)
B05B 1/26 (2006.01)
B05B 1/34 (2006.01)
B05B 7/10 (2006.01)
A62C 31/02 (2006.01)
A62C 35/68 (2006.01)
A62C 37/08 (2006.01)
A62C 99/00 (2010.01)

(52) U.S. Cl.
CPC .......... *B01D 47/10* (2013.01); *B01F 3/04503* (2013.01); *B01F 5/0423* (2013.01); *B01F 5/0471* (2013.01); *B05B 1/265* (2013.01); *B05B 1/3415* (2013.01); *B05B 7/045* (2013.01); *B05B 7/0425* (2013.01); *B05B 7/10* (2013.01); *A62C 35/68* (2013.01); *A62C 37/08* (2013.01); *A62C 99/0072* (2013.01); *B01F 2005/0436* (2013.01)

(58) Field of Classification Search
CPC ....... B05B 7/045; B05B 7/10; B01F 3/04503; B01F 5/0471

USPC ... 169/16–19, 37–41, 43, 47, 54, 56, 57, 60, 169/5
See application file for complete search history.

(56) References Cited

U.S. PATENT DOCUMENTS

| 3,708,015 | A | | 1/1973 | Yao |
| 5,511,621 | A | * | 4/1996 | Yao ..................... A62C 99/0009 169/17 |
| 6,830,109 | B1 | | 12/2004 | Sprakel |
| 2006/0021766 | A1 | * | 2/2006 | Golinveaux ......... A62C 35/645 169/46 |
| 2010/0213291 | A1 | | 8/2010 | Tsuji et al. |

FOREIGN PATENT DOCUMENTS

| JP | 49-124896 A | 11/1974 |
| JP | 52-050070 A | 4/1977 |
| JP | 56-56355 U | 5/1981 |
| JP | 61-87569 A | 5/1986 |
| JP | 05-026130 U | 4/1993 |
| JP | 07-155397 A | 6/1995 |
| JP | 3012031 U | 6/1995 |
| JP | 09-276439 A | 10/1997 |
| JP | 11-137708 A | 5/1999 |
| JP | 2000-288114 A | 10/2000 |
| JP | 2002-325858 A | 11/2002 |
| JP | 2005-058493 A | 3/2005 |
| JP | 2005-118356 A | 5/2005 |
| JP | 2010-184000 A | 8/2010 |
| KR | 10-2003-0093852 A | 12/2003 |
| KR | 10-2005-0101264 A | 10/2005 |
| KR | 10-2007-0094992 A | 9/2007 |
| WO | 2009/107421 A1 | 9/2009 |

OTHER PUBLICATIONS

International Searching Authority, International Search Report for PCT/KR2012/011514, dated Feb. 21, 2013.
State Intellectual Property Office of the P.R.C., Communication dated Jan. 27, 2016, issued in counterpart Chinese Application No. 201280069661.9.
Canadian Intellectual Property Office; Communication dated Nov. 8, 2016, in corresponding Application No. 2,861,760.
Japan Patent Office; Communication dated Feb. 21, 2017, issued in the corresponding Japanese Application No. 2014-549999.

* cited by examiner

VENTURI SPRINKLER AND APPARATUS FOR CONTROLLING SMOKE GENERATED BY FIRE

TECHNICAL FIELD

This invention relates to an apparatus for removing smoke and poisonous gas, and more specifically, it is related to sprinklers and smoke and poisonous gas-removing apparatus with watering functions.

BACKGROUND TECHNOLOGY

Sprinklers are apparatuses in which pipes installed near the ceiling automatically jet water in case of fire, providing an early fire suppression in buildings along with fire prevention. Yet in case of fire, more loss of human lives occurs from smoke inhalation (i.e., poisonous gas and fine dust) than burns.

Therefore, even with early fire suppression using sprinklers, if smoke removing apparatus for emitting smoke and poisonous gas into the air is not installed, realistically speaking, there is no method of responding to poisonous gas caused by fire. For this reason, although there may be differences to some extent, the issue of anxiety exists in losing human lives from smoke (i.e., poisonous gas and fine dust) even with sprinklers installed.

Also, the apparatuses that use the smoke ventilation method of emitting smoke and poisonous gas into air in case of fire are installed in emergency staircases of apartments and buildings along with various tunnels and are defined as various smoke removal apparatuses in fire-related regulations. Technically speaking, these apparatuses apply as smoke ventilation apparatuses that emit smoke and poisonous gas into air. Therefore, these are apparatuses that do not remove smoke and poisonous gas as stated in the term "smoke removal apparatus," but is merely a ventilation apparatus that emits smoke and poisonous gas into air.

Such apparatuses is not able to remove smoke and poisonous gas itself, making air pollution from smoke and poisonous gas inevitable.

DISCLOSURE

Technical Objectives

The objective of this invention is to provide a sprinkler and smoke removal apparatus that effectively remove smoke and poisonous gas to prevent hazards of poisonous gas with early fire suppression.

Another objective of this invention is to provide smoke and poisonous gas removal apparatus that can carry out the function of removing smoke along with sprinkler activation without excessive consumption of energy.

Another objective of this invention is to minimize the described sprinkler and smoke removal apparatus in both weight and size, and enable them to be removed and re-installed at a new location after initial installation and use.

Technical Solutions

In one general aspect, the apparatus for removing smoke and poisonous gas includes: a body configured to include a flux unit which supplies water, and a nozzle which is connected to the flux unit and has a narrower width than the flux unit; a frame configured to surround the body and include a suction part for removing smoke; and a heat-sensitive unit fixed to seal the nozzle. When the flux unit, nozzle, and frame spray fluid at a certain pressure and high speed through the nozzle, pressure energy of the fluid is changed to velocity energy, forming a vacuum state in the suction room at a low pressure from the fast speed. The suction part is then positioned to surround the nozzle, and the frame is positioned surrounding the heat sensitive unit, forming the operation of a vacuum ejector for sucking another fluid.

The frame may be provided in the shape of a venturi tube in which the cross-sectional surface of the formed portion surrounding the heat sensitive unit is narrowed and then again broadened.

The apparatus may further include a Jabara-type multi-stage ring configured to include several rings having different diameters and attached to surround the lower end of the frame, wherein the a plurality of rings overlap each other in the normal state and not in the state of fire, and upon reaching an operating temperature, the heat sensitive unit is dropped, and the plurality of rings are unfolded.

The apparatus may further include a deflector configured to allow water, sprayed through the nozzle, to be sprayed on a broad area, wherein the largest-diameter ring of the various rings included in the Jabara-type multi-stage ring is attached to the deflector.

Each of the various rings included in the Jabara-type multi-stage ring may have a bottle-cap shape with an open top, and in the normal state, the plurality of rings may be separated from each other, and the rings other than a largest-size ring may be overlapped with the largest-size ring in the order of increasing size. When the plurality of rings are unfolded, the end of a ring may serve as the connection portion of each ring and the other ring may have creases corresponding to creases of the bottle cap, then the upper portion of each ring may be caught on the creases of the next ring so that each ring may not fall out.

The apparatus may further include a vortex generating unit included in the nozzle.

The nozzle may be provided in two or more.

The apparatus may further include a filter included in the suction part.

The filter may be a spring filter.

The apparatus may further include a dust box configured to collect pollutants collected by the filter.

The apparatus may further include: an impeller included in the suction part and configured to operate according to the movement of air sucked through the suction part; a small electricity generator configured to generate electricity by using the rotation of the impeller; and a lighting lamp adhered to the frame, electrically connected to the small electricity generator and configured to emit light according to the operation of the small electricity generator.

The apparatus may further include: an impeller included in the flux unit, and configured to operate according to a movement of water supplied through the flux unit; a small electricity generator configured to generate electricity by using the rotation of the impeller; and a lighting lamp adhered to the frame, electrically connected to the small electricity generator, and configure to emit light according to the operation of the small electricity generator.

The apparatus may further include a water flow adjusting unit provided on the impeller included in the flux unit, and configured to include a hole which allows the flow of water supplied to the flux unit to be changed to the rotating direction of the impeller.

The apparatus may further include a tube connected to the suction part, and configured to extend from the portion in which the apparatus is installed to another portion, allowing air to be sucked from the other area.

This may be connected to a water supply pipe by using a quick coupler which automatically allows a supply of water to be stopped when the apparatus is removed.

The apparatus may further include a vacuum unit provided in the body to surround the flux unit and the nozzle.

In another general aspect, the fire hose nozzle includes: a body configured to include a flux unit which supplies water, a nozzle which is connected to the flux unit and has a narrower width than the flux unit; and a frame configured to surround the body, and include a suction part for removing smoke. When the flux unit, the nozzle, and the frame spray fluid at a certain pressure and high speed through the nozzle, pressure energy of the fluid is changed to velocity energy, forming a vacuum state in the suction room at a low pressure due to the fast speed. The suction part and the frame are then positioned to surround the nozzle, forming the operation of a vacuum ejector for sucking another fluid.

The fire hose nozzle may further include a tube configured to connect the suction part to a firefighting drug tank.

The fire hose nozzle may further include: an impeller included in the flux unit and configured to operate according to the movement of water supplied through the flux unit; a small electricity generator configured to generate electricity by using the rotation of the impeller; and a lighting lamp adhered to the frame, electrically connected to the small electricity generator and configured to emit light according to the operation of the small electricity generator.

In another general aspect, firemen mask includes: the fire hose nozzle; a filter connected to the suction part through the first tube; a suction port connected to the filter and disposed to suck ambient air with suction force of the suction part to allow the sucked ambient air to pass through the filter; and a second tube configured to supply the air, passing through the filter, to a desired position.

In another general aspect, the apparatus for removing smoke and poisonous includes: a body configured to include a flux unit which supplies water, and a nozzle which is connected to the flux unit and has a narrower width than the flux unit; a frame configured to surround the body including a suction part for removing smoke; an impeller configured to operate with a pressure of water sprayed through the nozzle; and a suction fan connected to the impeller through a belt and disposed near the suction part. When the flux unit, the nozzle, and the frame spray fluid at a certain pressure and high speed through the nozzle, pressure energy of the fluid is changed to velocity energy, forming a vacuum state in the suction room at low pressure due to fast speed, and the suction part and the frame are positioned to surround the nozzle, forming an operation of a vacuum ejector for sucking another fluid.

In another general aspect, the apparatus for removing smoke and poisonous includes: a body configured to include a flux unit, which supplies fluid, and a nozzle which is connected to the flux unit and has a narrower width than the flux unit; and a frame configured to surround the body, and include a suction part for removing smoke. When the flux unit, the nozzle, and the frame spray fluid at a certain pressure and high speed through the nozzle, pressure energy of the fluid is changed to velocity energy, forming a vacuum state in the suction room at low pressure due to fast speed, and the suction part and the frame are positioned to surround the nozzle, forming an operation of a vacuum ejector for sucking another fluid.

In another general aspect, a preventive drug spray device includes: a body configured to include a flux unit which supplies fluid including preventive drugs, and a nozzle which is connected to the flux unit and has a narrower width than the flux unit; a frame configured to surround the body including a suction part for removing smoke; a collection unit configured to collect at least some of the sprayed fluid; a filtering unit configured to filter the fluid collected by the collection unit; and a circulation pump configured to resupply the fluid filtered by the filtering unit to the flux unit. When the flux unit, the nozzle, and the frame spray fluid at a certain pressure and high speed through the nozzle, pressure energy of the fluid is changed to velocity energy, a vacuum state is formed in the suction room at low pressure due to fast speed, and the suction part and the frame are positioned to surround the nozzle, forming the operation of a vacuum ejector for sucking another fluid.

In another general aspect, a smoke removing sprinkler includes: a nozzle connected to a pipe section which supplies water when fire occurs and configured to spray water supplied from the pipe section; and a mixing chamber in which the water sprayed through the nozzle is mixed with smoke, wherein the mixing chamber has a venturi tube shape in which the cross-sectional surface is narrowed in the center.

The mixing chamber may be provided to have one or more spaces having the shape of a ring doughnut in the center, and the one or more spaces may generate an eddy by using a vortex effect.

The smoke removing sprinkler may further include a vortex generating unit included in the nozzle.

The smoke removing sprinkler may further include a deflector provided under the mixing chamber to have a tetragonal structure and configured to spray water on all corners of a tetragonal room, wherein the cross-sectional surface of the mixing chamber has a tetragonal shape.

Each of the nozzle and the mixing chamber may be provided as two or more.

In another general aspect, an apparatus for removing smoke and poisonous includes: a body configured to include a space in which water is mixed with smoke; an air vortex inductor provided on the body and configured to allow sucked air to have vortex flow forming a spiral eddy; a vortex circular inductor provided under the air vortex inductor, connected to the pipe section which supplies water and configured to spray water in the shape of a spiral eddy; a vortex nozzle provided under the vortex circular inductor, connected to the pipe section and configured to spray water having vortex flow; and a venturi tube provided to surround the vortex nozzle.

Each of the vortex nozzle and the venturi tube may be provided as two or more.

The vortex circular inductor may be provided as two or more.

The apparatus may further include a suction pipe configured to suck smoke from the body.

The apparatus may further include a waste water discharging pipe configured to discharge waste water from the body.

The apparatus may further include a tank configured to store waste water discharged from the body.

The apparatus may further include a clean air discharging pipe configured to discharge clean air discharged from the tank.

The apparatus may further include a circulation pump configured to circulate the waste water stored in the tank.

Advantageous Effects

According to embodiments of the present invention, the watering function and smoke removal function of removing smoke and a poisonous gas are performed without consuming separate energy, thereby decreasing the amount of $CO_2$ which contributes to global warming.

That is, when fire occurs, poisonous materials included in smoke and gas which are hot, light and with high pressure are mixed with water due to the water pressure from the pipe of existing sprinklers even without using separate energy, and thus removed. Then, the smoke and the poisonous gas are effectively removed by sprinkling water on the cause of fire. Also, in computer rooms, communication rooms or in electricity rooms in which water cannot be sprinkled directly, a suction part that sucks smoke, poisonous gas and fine dust is connected to a discharging pipe through the pipe with a separate draining port, in which treated water is drained and clean air is reused. Therefore, smoke and poisonous gas of specific areas in which water cannot directly be sprinkled and the fine dust of subway stations are sucked in are cleanly and economically removed, thereby preserving the health of every citizen.

A moving part is not provided in the apparatus, and thus, there is no breakdown factor. The structure is simple and maintenance is easy. The performance of the operation is constant and service life is long.

The apparatus provided in indoor areas does not need separate equipment and is merely attached to the pipe of the existing sprinkler, thereby removing smoke, poisonous gas, and fine dust in subway stations. Therefore, separate pipe installation cost is not expended and installation is made by using the existing pipes. Accordingly, an economical effect is greatly obtained.

All buildings are "Manhattanized" and an aerial ladder for fire cannot reach high floors. Therefore, such limitation is supplemented and when fire occurs, many human lives are rescued from the risks of smoke and poisonous gas.

When fire occurs, a mobile apparatus is provided in the passage through which smoke and poisonous gas are emitted. This is a pipe connected to fire engines and it removes smoke and poisonous gas which are emitted into air and surroundings to discharge the smoke and poisonous gas from the water tank. When clean air is emitted into the air, the mobile apparatus acts as an apparatus for preventing air pollution and reducing the amount of $CO_2$. When extinguishing fire, the present invention removes poisonous gas around firemen contributing to the safety of firemen, and secures the fireman's view, thereby enabling the fire to be easily and quickly extinguished.

When fire occurs in karaoke and reading rooms which do not include sprinklers and smoke removing apparatuses, loss of human life is frequently caused by smoke and poisonous gas. If installation is made at the low personal cost of a business owner such as in air conditioners which is not included in facilities of buildings with high risks or when reinstallation is made after disassembly, many human lives can be protected from risks in home and various business establishments.

The present invention may be applied as an air cleaning apparatus, a sterilizing apparatus, a preventive apparatus and an apparatus for removing smoke, poisonous gas and fine dust (which are emitted from subways, railways, vehicles, and combustion engines) and also for removing smoke and odors which occurs when roasting various meat and fish.

A drug (water) tank and pumps are provided, and sprayed liquid drugs are collected by the drug tank through the pipe and circulated. Accordingly, drugs and water are economically saved.

In special cases, a water tank and pump are provided, and water and special drugs are circulated. In special cases other than fire, the present invention may be applied as an apparatus for directly removing chemical, biological and radiological (CBR) materials, poisonous gas, and other materials spread into the air. It can also be applied as a dedicated CBR processing vehicle for removing smoke and poisonous gas for soldiers and police.

When extinguishing fire, poisonous gas surrounding firemen is removed by using a fire hose nozzle or fireman masks, and thus, the present invention secures the safety of firemen and allows fire to be extinguished easily.

BEST MODE

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
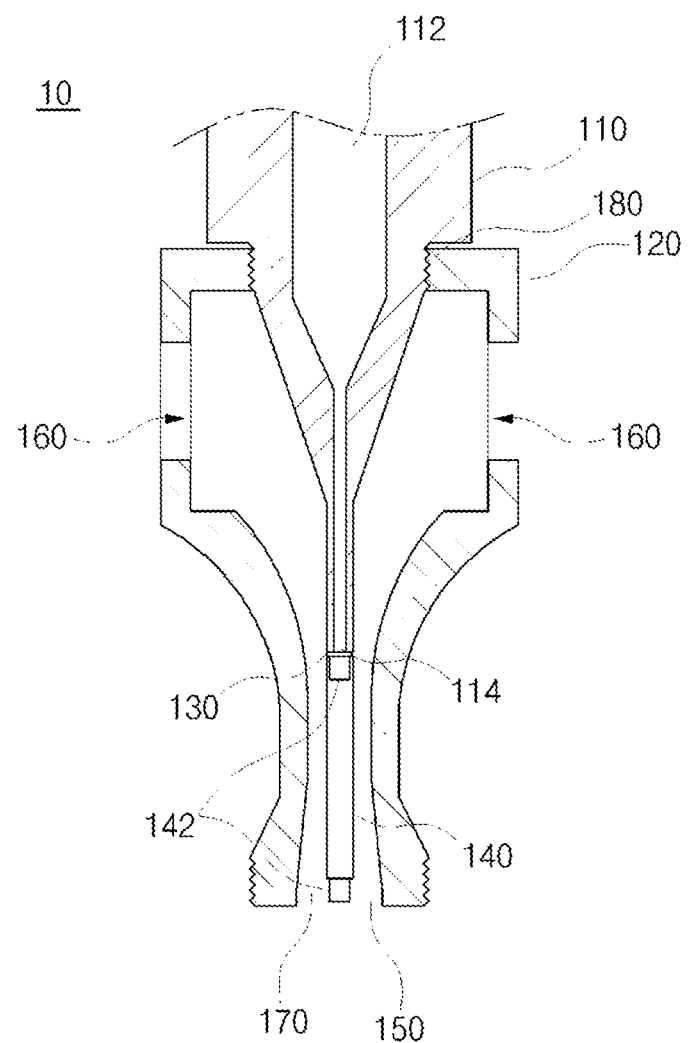
FIG. 1 is a cross-sectional view of smoke and poisonous gas removing apparatus according to an embodiment of the present invention.
Figure 2:
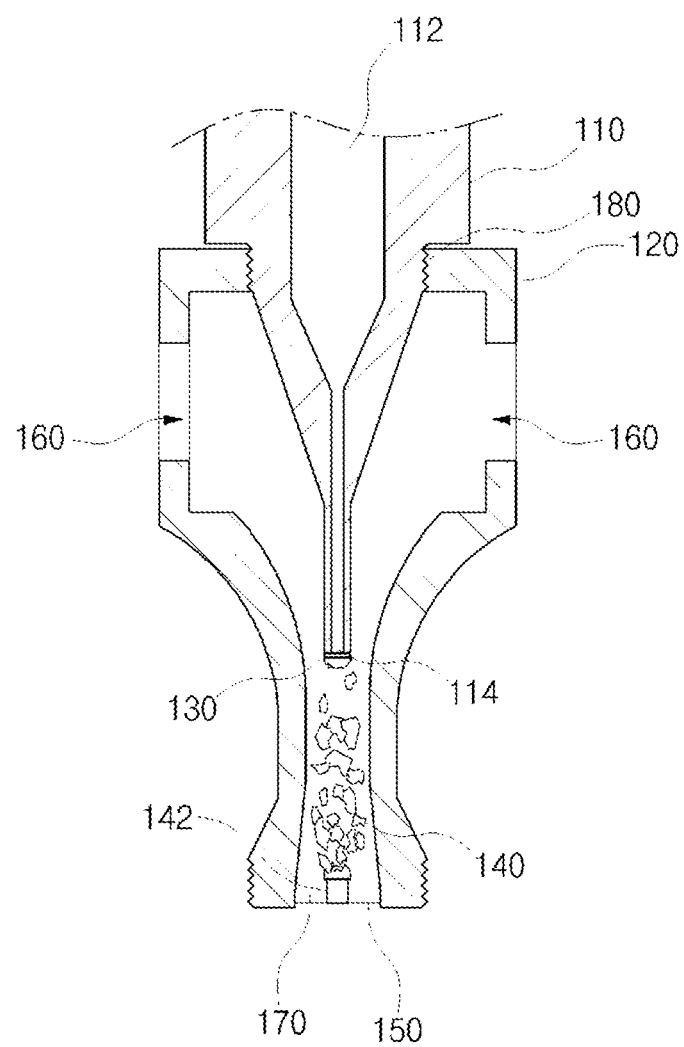
FIG. 2 is a cross-sectional view illustrating the state in which a glass bulb is broken and the smoke and poisonous gas removing apparatus according to the embodiment of the present invention reaches an operating temperature.
Figure 3:
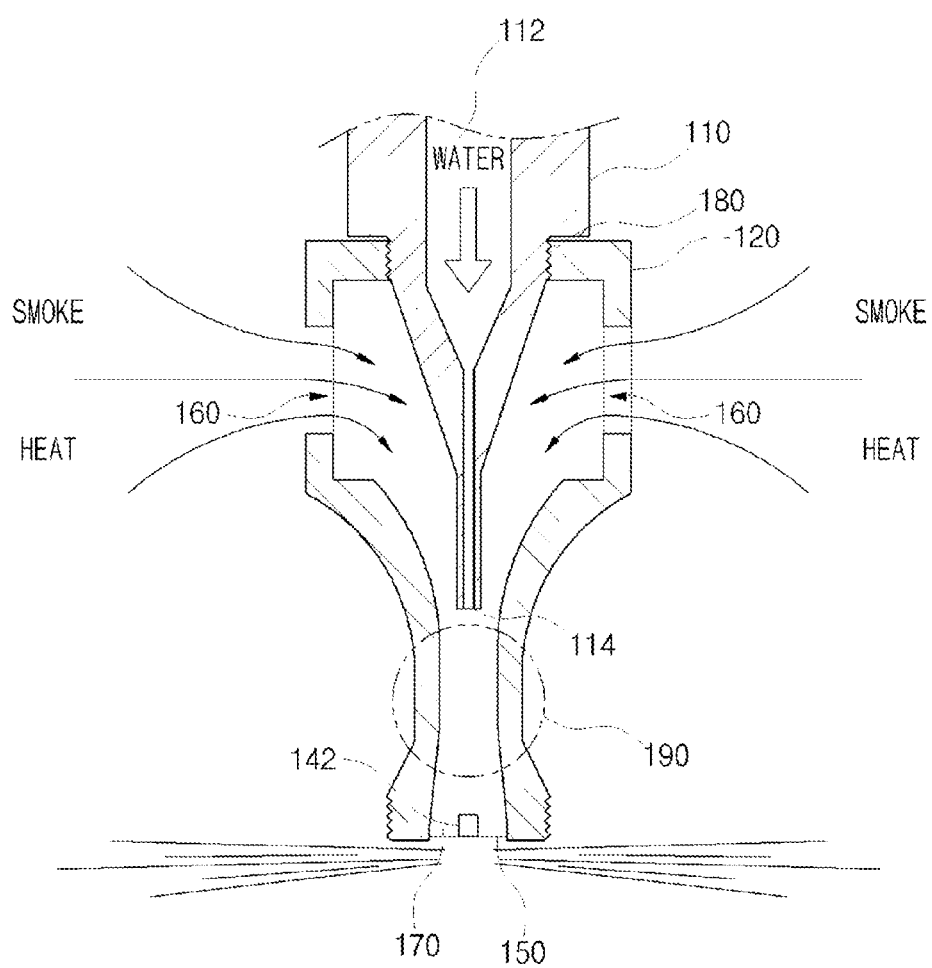
FIG. 3 is a cross-sectional view illustrating the state in which the smoke and poisonous gas removing apparatus according to the embodiment of the present invention reaches an operating temperature, the glass bulb is broken, and the sprinkling of water and the removal of smoke are started.

FIG. 1 is a cross-sectional view of smoke and poisonous gas removing apparatus according to an embodiment of the present invention. FIG. 2 is a cross-sectional view illustrating the state in which a glass bulb is broken and the smoke and poisonous gas removing apparatus according to the embodiment of the present invention reaches an operating temperature. FIG. 3 is a cross-sectional view illustrating the state in which the smoke and poisonous gas removing apparatus according to the embodiment of the present invention reaches an operating temperature, the glass bulb is broken, and the sprinkling of water and the removal of smoke are started.

As illustrated in FIG. 1, the smoke and poisonous gas removing apparatus according to an embodiment of the present invention includes: a body 110 that includes a flux unit 112 and a nozzle 114 for supplying water when fire occurs; a frame 120 that surrounds the body 110 and includes a suction part 160 for removing smoke and a mixture unit (190 in FIG. 3) in which smoke is mixed with water; a heat sensitive unit 140 that is fixed to seal the nozzle 114 in a normal state; a heat sensitive unit holder 142 that fixes the heat sensitive unit 140; a sealing unit 130 that is disposed between the heat sensitive unit holder 142 and the nozzle 114; and a deflector 150 that disperses water discharged through a discharging port 170.

The body 110 and the frame 120 are formed of metal material, and may be coupled to each other with a screw 180 or coupled by various different types. Alternatively, the body 110 and the frame 120 may be provided as one body.

The heat sensitive unit 140 may use a meltable heat sensitive unit including a small amount of metal which is melted at setting temperature, or use a rupturable heat sensitive unit including a glass bulb with small amount of liquid and having good heat expandability.

The flux unit 112, nozzle 114, and frame 120 of the smoke and poisonous gas removing apparatus according to an embodiment of the present invention spray fluid having pressure at high speed by using a nozzle to convert pressure energy of the fluid into velocity energy, and is provided to operate as an ejector so that a vacuum state is formed in a suction room by high speed and low-pressure fluid is sucked.

That is, as illustrated in FIG. 2, fire occurs, temperature rises, temperature reaches a setting temperature, glass bulb 140 that is the heat sensitive unit is broken, and the heat sensitive unit holder 142 and the sealing unit 130 are dropped together. As illustrated in FIG. 3, the flux unit 112 and the nozzle start to sprinkle water. When the sprinkling of water is started, a vacuum state is formed around the flux unit 112 and the nozzle 114 by velocity energy of water which is sprayed at a fast speed, and thus, the suction part 160 sucks air outside the sprinkler. In this case, the sucked air is air including various poisonous materials which are generated by heat and fire. Water that is pressure fluid sprayed by the nozzle 114 is mixed with poisonous gas that is sucked with low-pressure fluid, and the water and poisonous gas are converted into pressure energy through the discharging port 170, an enlargement unit. The water mixed with poisonous gas is dispersed and sprayed through the deflector 150.

In this case, frame 120 is provided in the shape of a venturi tube of which a cross-sectional surface is narrowed and then is again broadened, allowing water to be efficiently mixed with a poisonous gas.

Figure 4:
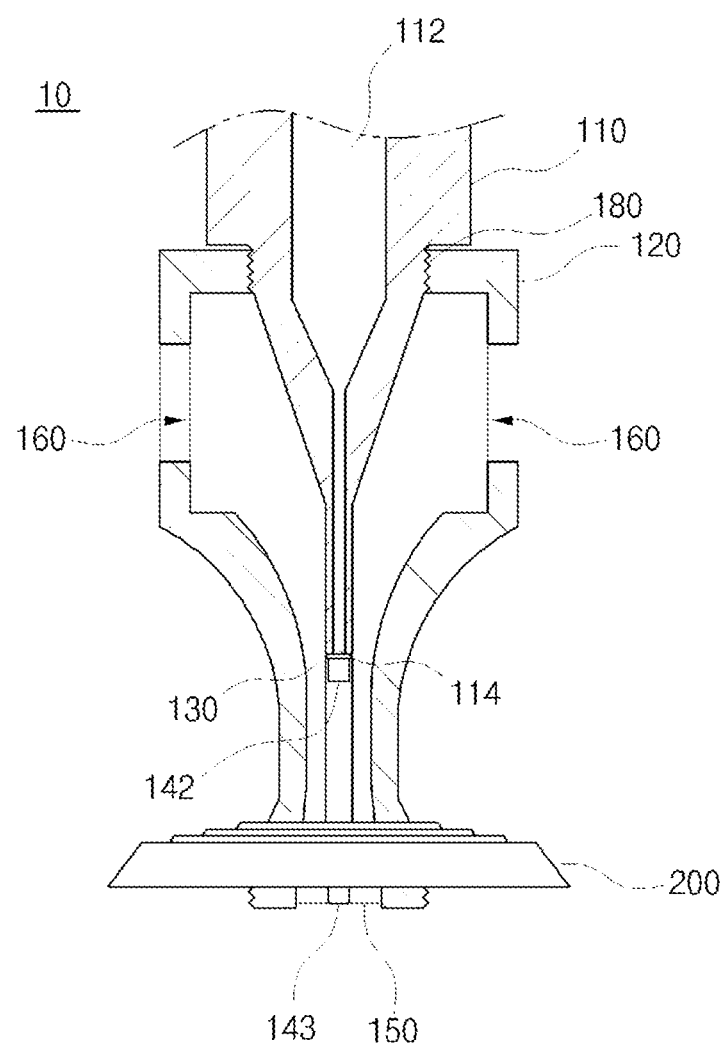
FIG. 4 is a cross-sectional view of smoke and poisonous gas removing apparatus with an enhanced smoke removal function according to another embodiment of the present invention.
Figure 5:
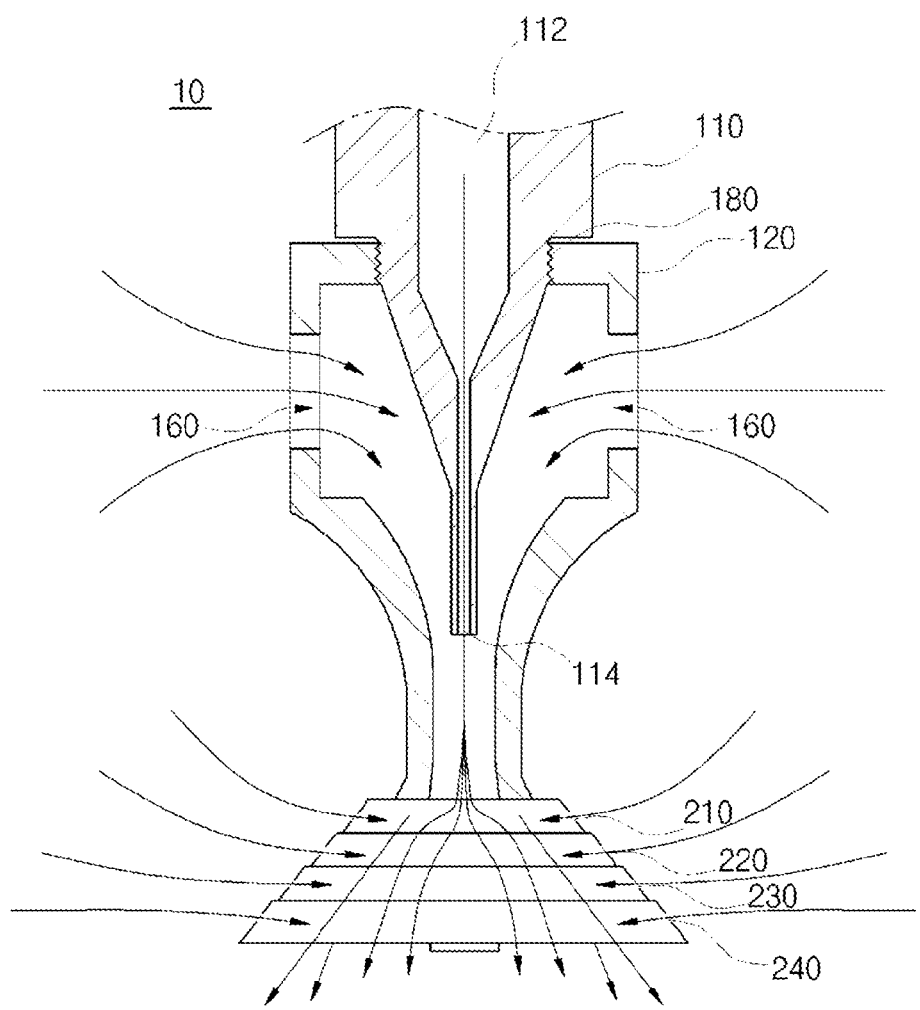
FIG. 5 is a cross-sectional view illustrating the state in which the smoke and poisonous gas removing apparatus according to another embodiment of the present invention reaches an operating temperature, a glass bulb is broken, and the sprinkling of water and removal of smoke are started.

FIG. 4 is a cross-sectional view of smoke and poisonous gas removing apparatus with an enhanced smoke removal function according to another embodiment of the present invention. FIG. 5 is a cross-sectional view illustrating the state in which the smoke and poisonous gas removing apparatus according to another embodiment of the present invention reaches an operating temperature, a glass bulb is broken, and the sprinkling of water and removal of smoke are started.

As illustrated in FIG. 4, a Jabara-type multi-stage ring 200 is attached to the lower end of the frame 120, and the deflector 150 is attached to the outermost and largest ring of the Jabara-type multi-stage ring 200.

In the Jabara-type multi-stage ring 200, as illustrated in FIG. 4, the plurality of rings having different diameters overlap each other in a normal state. When the smoke and poisonous gas removing apparatus reaches an operating temperature, the glass bulb is broken, and thus, as illustrated in FIG. 5, the plurality of rings are downward unfolded.

A suction port is provided at a side of each of the plurality of rings 210 to 240 included in the Jabara-type multi-stage ring 200 and sucks air including heat and poisonous materials.

Figure 6:
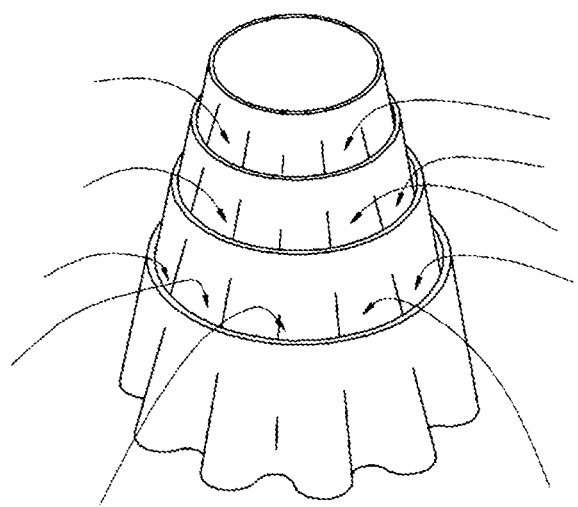
FIG. 6 illustrates the shape of Jabara-type multi-stage ring with maximized smoke removal function according to another embodiment of the present invention.

FIG. 6 illustrates the shape of Jabara-type multi-stage ring with maximized smoke removal function according to another embodiment of the present invention.

As illustrated in FIG. 6, each of the plurality of rings included in the Jabara-type multi-stage ring has a bottle cap shape with an open top, and the size of each of the rings increases progressively closer to the bottom.

In a normal state where fire does not occur, the rings are separated from each other, and the rings other than a largest-size ring are overlapped with the largest-size ring in the order of increasing size.

The end of a ring that is the connecting portion of rings has different sizes and also has creases corresponding to creases of bottle caps, and thus, the upper portion of each ring is caught on creases of upper rings. Therefore, each ring is folded and unfolded so as not to fall out.

When a sprinkler starts to operate because fire occurs, the glass bulb that is the heat sensitive unit is broken, and water is sprayed downward. A deflector attached to the largest-size ring is pushed by the pressure of water, and thus, the rings are pulled, coupled to each other and automatically unfolded.

When the Jabara-type multi-stage ring is unfolded, water is dispersed into each creased cup, and a venturi effect occurs between each ring and creases corresponding to creases of bottle caps. A vacuum state occurs between creases of each ring, and thus, more smoke is sucked in is automatically mixed with sprayed water.

The smoke and poisonous gas removing apparatus according to an embodiment of the present invention may include a vortex generating unit that changes fluid flow to vortex flow, in order for water to be more efficiently mixed with poisonous gas.

Figure 7:
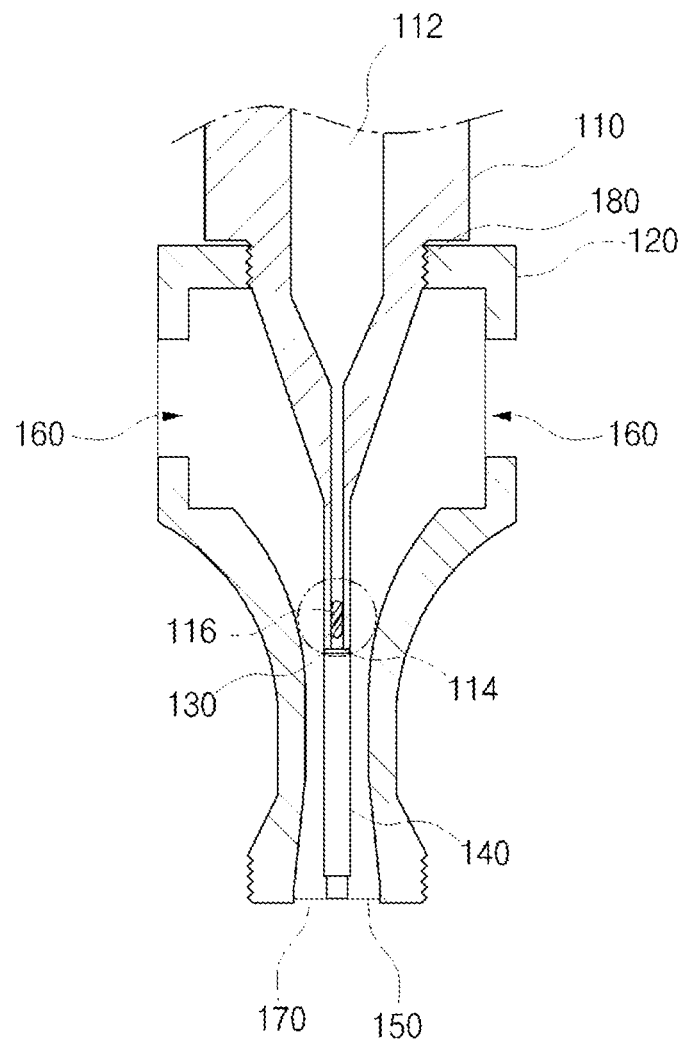
FIG. 7 is a cross-sectional view of smoke and poisonous gas removing apparatus according to another embodiment of the present invention.
Figure 8:
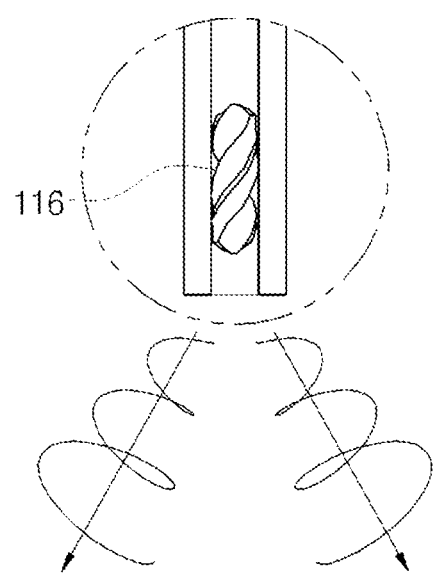
FIG. 8 is an enlarged view of the watering nozzle of smoke and poisonous gas removing apparatus according to another embodiment of the present invention.
Figure 9:
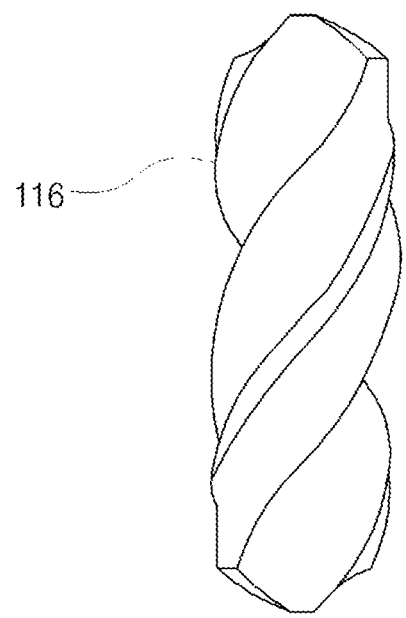
FIG. 9 is an enlarged view of a vortex generating unit inserted into the watering nozzle of smoke and poisonous gas removing apparatus according to another embodiment of the present invention.
Figure 10:
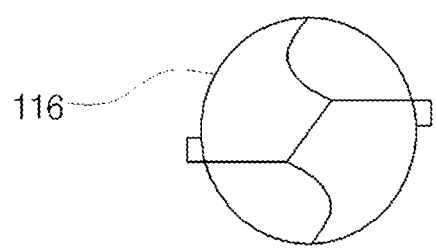
FIG. 10 is a cross-sectional view of a vortex generating unit inserted into the watering nozzle of smoke and poisonous gas removing apparatus according to another embodiment of the present invention.

FIG. 7 is a cross-sectional view of smoke and poisonous gas removing apparatus according to another embodiment of the present invention. FIG. 8 is an enlarged view of the watering nozzle of smoke and poisonous gas removing apparatus according to another embodiment of the present invention. FIG. 9 is an enlarged view of a vortex generating unit inserted into the watering nozzle of smoke and poisonous gas removing apparatus according to another embodiment of the present invention. FIG. 10 is a cross-sectional view of a vortex generating unit inserted into the watering nozzle of smoke and poisonous gas removing apparatus according to another embodiment of the present invention.

The smoke and poisonous gas removing apparatus according to another embodiment of the present invention, as illustrated in FIG. 7, includes the rotary blade 116, which is a vortex generating unit, for forming vortex flow in a nozzle 114. Due to the rotary blade 116, the flow of water supplied from a flux unit 112 is changed from linear flow to vortex flow and is discharged through the nozzle 114.

Therefore, as illustrated in FIG. 8, since water having the vortex flow is discharged, water is more effectively mixed with poisonous gas.

A structure of the vortex generating unit 116 is not limited to FIGS. 7 to 10, the vortex generating unit 116 may have all structures that enable the vortex flow to be formed.

Figure 11:
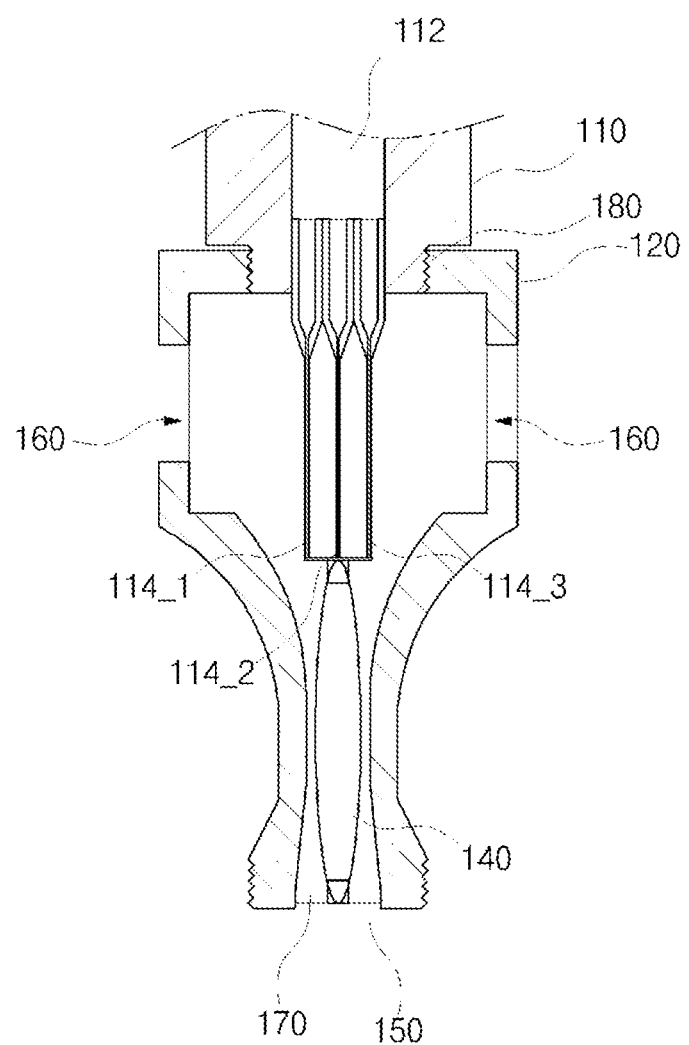
FIG. 11 is a cross-sectional view of smoke and poisonous gas removing apparatus including various watering nozzles according to another embodiment of the present invention.

FIG. 11 is a cross-sectional view of smoke and poisonous gas removing apparatus including the plurality of watering nozzles according to another embodiment of the present invention.

According to another embodiment, as illustrated in FIG. 11, two or more water spraying nozzles are provided (for example, in FIG. 11, three water spraying nozzles 114_1 to 114_3 are provided), and thus, the suction force for poisonous gas is adjusted more strongly.

Figure 12:
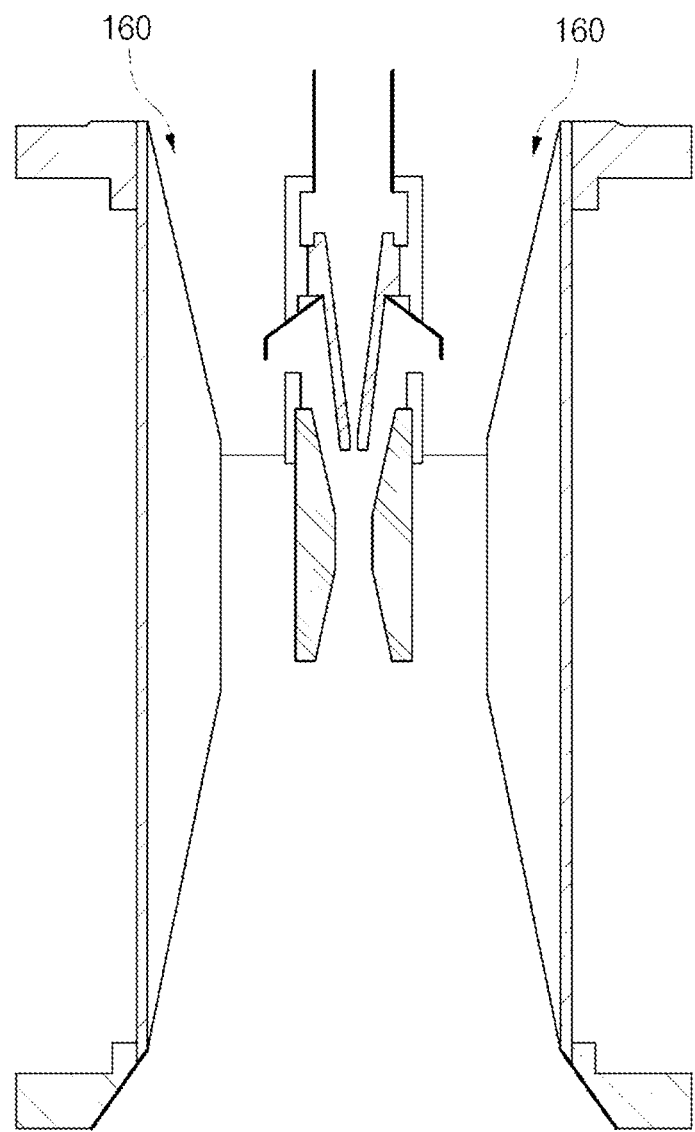
FIG. 12 is a cross-sectional view of smoke and poisonous gas removing apparatus according to another embodiment of the present invention.

FIG. 12 is a cross-sectional view of smoke and poisonous gas removing apparatus according to another embodiment of the present invention.

As illustrated in FIG. 12, a suction part may not be provided at both sides of the frame, and a frame may be provided to include another type of suction part 160. The frame may suck air around a sprinkler by using a vacuum state which is formed by spraying water through a nozzle, without being limited to the shape.

Moreover, the frame may be provided in various shapes. In addition, a pipe may be connected to a suction part, and thus, smoke may be removed from a different place which is directly connected to the smoke and poisonous gas removing apparatus. For example, a pipe may be connected to an area in which water cannot directly be sprayed by using a sprinkler, such as computer rooms, electricity rooms, emergency stairs of a high-rise apartment buildings or buildings, and the sprinkler operates removing poisonous gas from the corresponding space.

Figure 13:
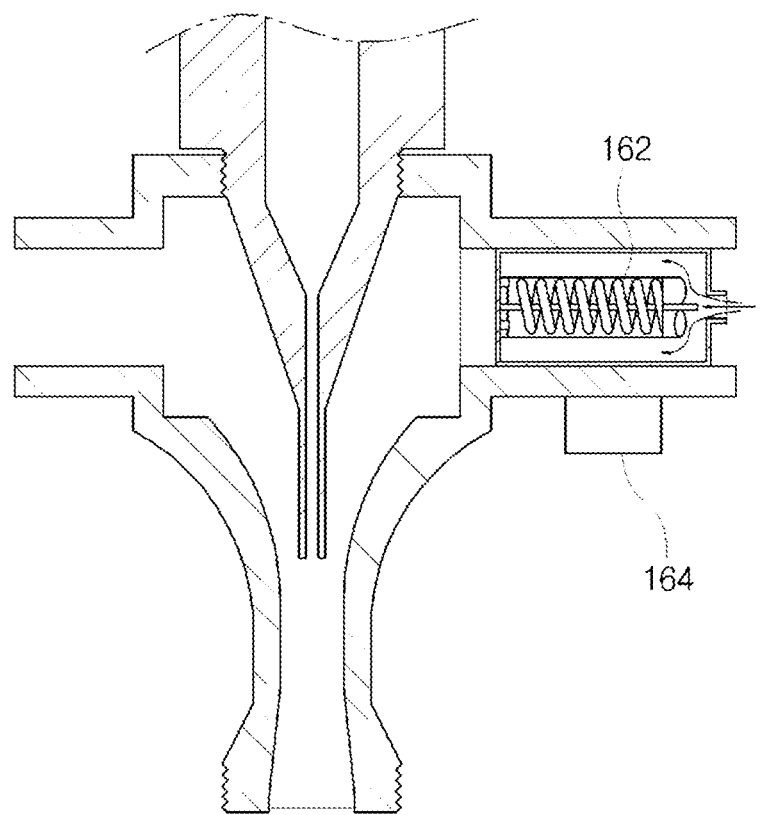
FIG. 13 is a cross-sectional view of smoke and poisonous gas removing apparatus including a filter and dust box for enhancing the performance of smoke removal, according to another embodiment of the present invention.

FIG. 13 is a cross-sectional view of smoke and poisonous gas removing apparatus including a filter and dust box for enhancing the performance of smoke removal, according to another embodiment of the present invention.

As illustrated in FIG. 13, a filter 162 is provided in a suction part and removes poisonous materials included in sucked air. In this case, the kind of the filter is not limited, and the filter may use a spring filter which filters only fine particles by pushing or pulling the center of a spring with a bolt or a nut. Also, a dust box 164 may be provided under the filter 162, and may remove poisonous materials collected by the filter 162.

Figure 14:
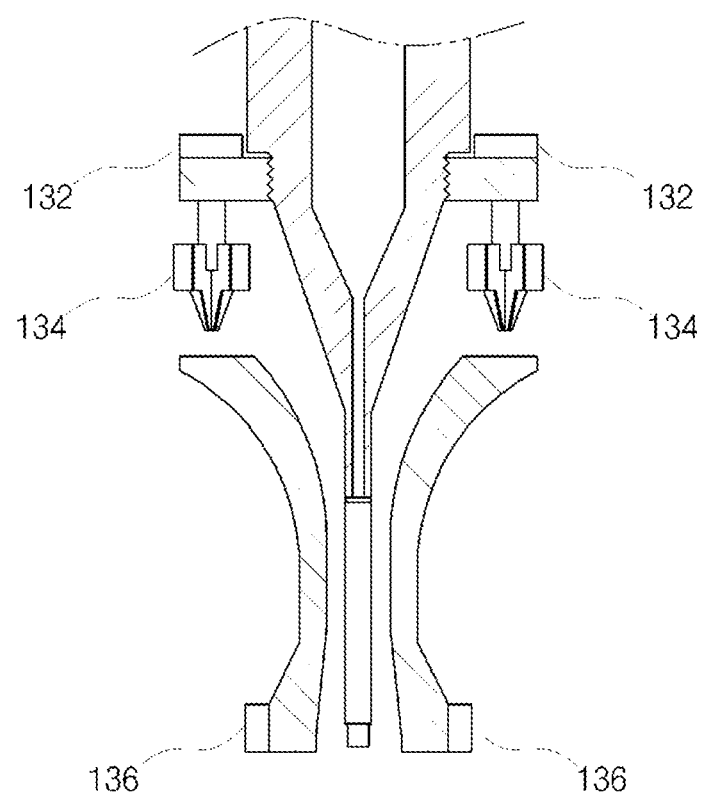
FIG. 14 is a cross-sectional view of smoke and poisonous gas removing apparatus for turning on light emitting diode (LED) by using energy based on suction of smoke, according to another embodiment of the present invention.

Energy from smoke sucked into the suction part may be used for lighting. FIG. 14 is a cross-sectional view of smoke and poisonous gas removing apparatus for turning on light emitting diode (LED) by using energy based on suction of smoke, according to another embodiment of the present invention.

As illustrated in FIG. 14, an impeller 134 may be provided at a suction part 160 which is provided at both sides of the frame. Electricity may be generated by connecting the impeller 134 to a small electricity generator 132, and may turn on an LED lamp 136 attached to a sprinkler.

The LED lamp 136 may be automatically turned on at the same time when the sprinkler operates and may act as an induction lamp or an emergency lamp.

In order to more obtain electricity used to obtain lighting, electricity may be generated by using a pressure of water supplied to the sprinkler.

Figure 15:
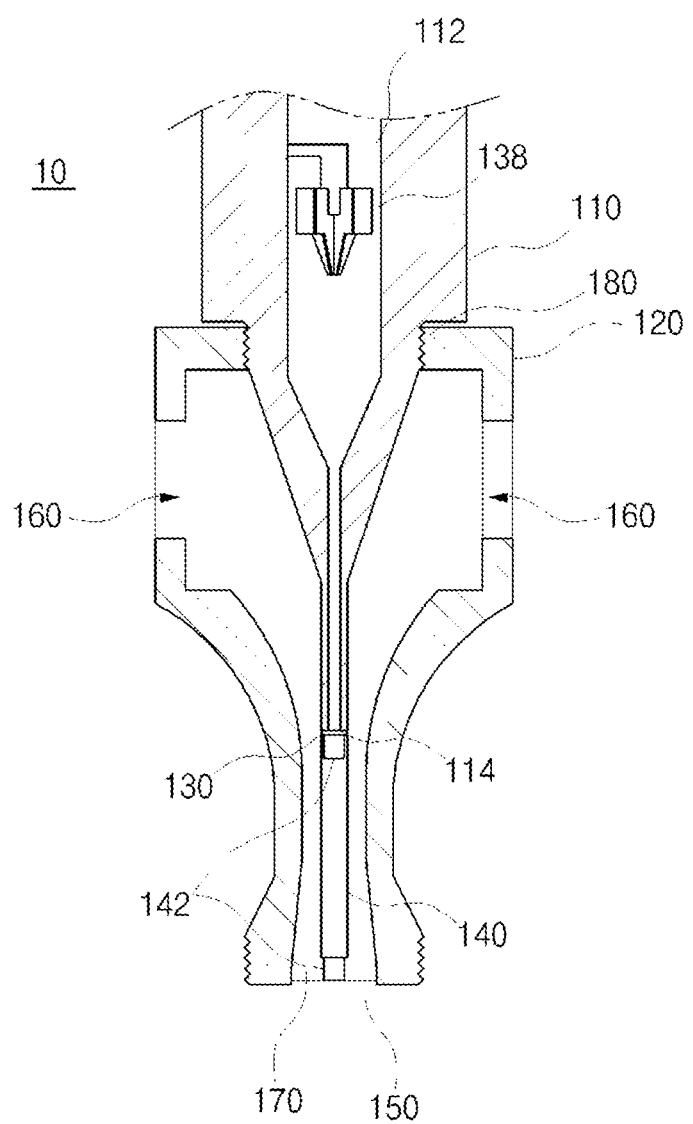
FIG. 15 is a view illustrating smoke and poisonous gas removing apparatus for turning on a lighting lamp by generating electricity with water pressure, according to another embodiment of the present invention.

FIG. 15 is a view illustrating smoke and poisonous gas removing apparatus for turning on a lighting lamp by generating electricity with water pressure, according to another embodiment of the present invention.

As illustrated in FIG. 15, an impeller 138 may be provided in a flux unit 112, and an electricity generator 132 may be provided to be connected to the impeller 138. Electricity may be generated by using a pressure of water supplied to a sprinkler, and may turn on an LED lamp 136.

In generating electricity by using water pressure, a vortex effect may be used for enhancing generation effect.

Figure 16:
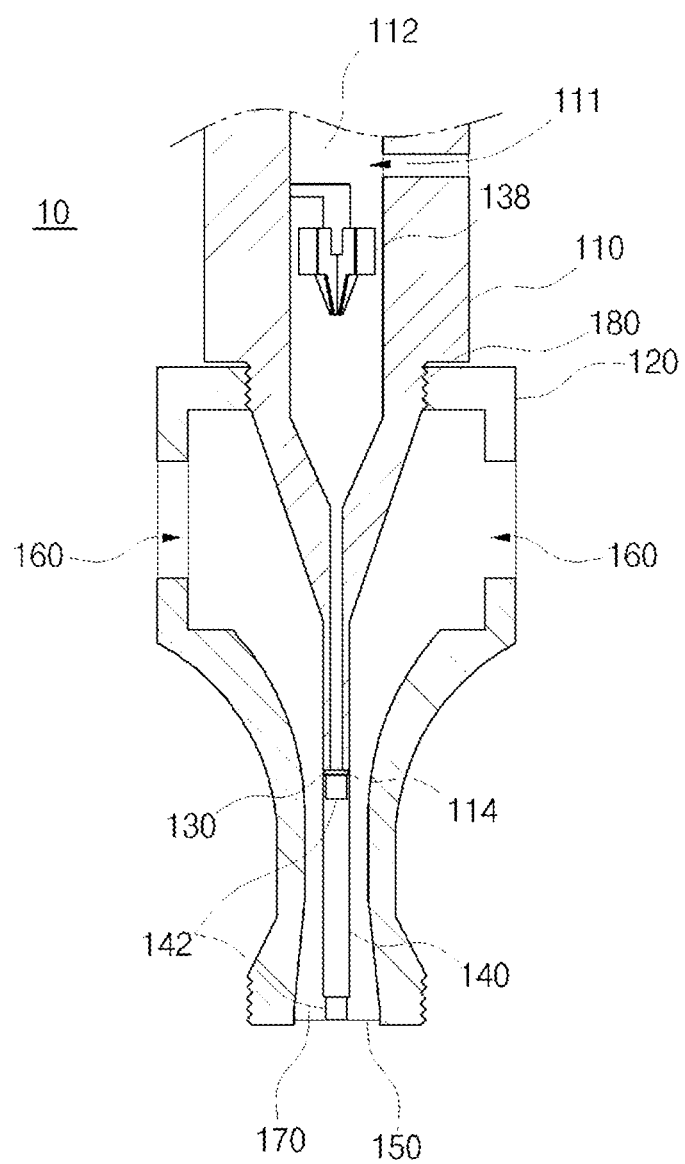
FIG. 16 illustrates smoke and poisonous gas removing apparatus for turning on a lighting lamp by using the vortex effect and water pressure, according to another embodiment of the present invention.

FIG. 16 illustrates smoke and poisonous gas removing apparatus for turning on a lighting lamp by using a vortex effect and water pressure, according to another embodiment of the present invention.

As illustrated in FIG. 16, when an impeller is provided in order for water to be supplied from side 111 of a flux unit 112, a vortex effect in which water rotates in the rotating direction of the impeller may be generated, thereby effectively generating electricity.

When the structure of a sprinkler is a structure which is difficult to supply water from one side, a water flow correcting plate may be simply inserted to the sprinkler, thereby inducing the vortex effect.

Figure 17:
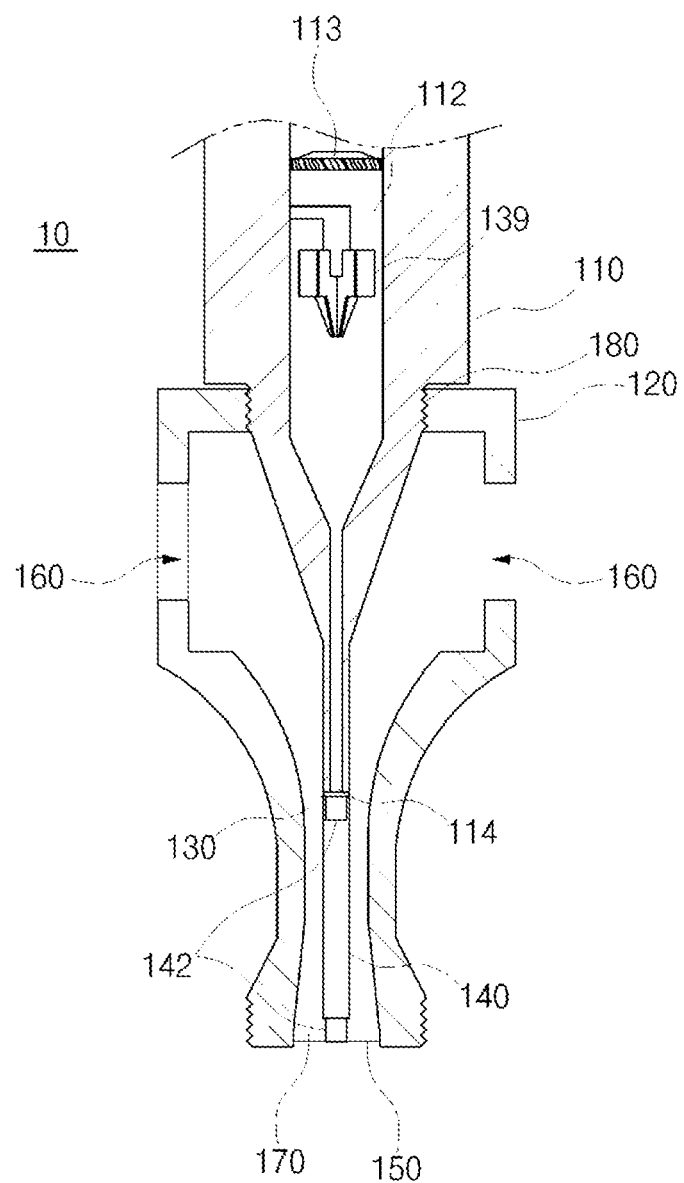
FIG. 17 is a view illustrating smoke and poisonous gas removing apparatus with a water flow correcting plate inserted, according to another embodiment of the present invention.
Figure 18:
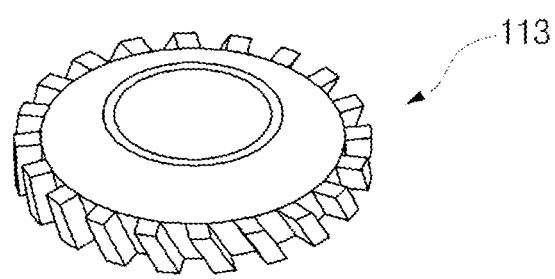
FIG. 18 is an enlarged view of the water flow correcting plate of FIG. 17.

FIG. 17 is a view illustrating smoke and poisonous gas removing apparatus with a water flow correcting plate inserted, according to another embodiment of the present invention. FIG. 18 is an enlarged view of the water flow correcting plate of FIG. 17.

As illustrated in FIGS. 17 and 18, a water flow correcting plate 113 may be mounted on an upper end of an impeller 139 in a flux unit 112 and hole 113, through which water passing in a slope direction is formed in the water flow correcting plate 113. Therefore, the direction of water supplied to the impeller 139 side is changed. Accordingly, a vortex effect occurs and rotates the impeller 139, thereby enhancing the performance of electricity generation.

The smoke and poisonous gas removing apparatus according to an embodiment of the present invention may be connected to all pipes through a quick coupler.

Figure 19:
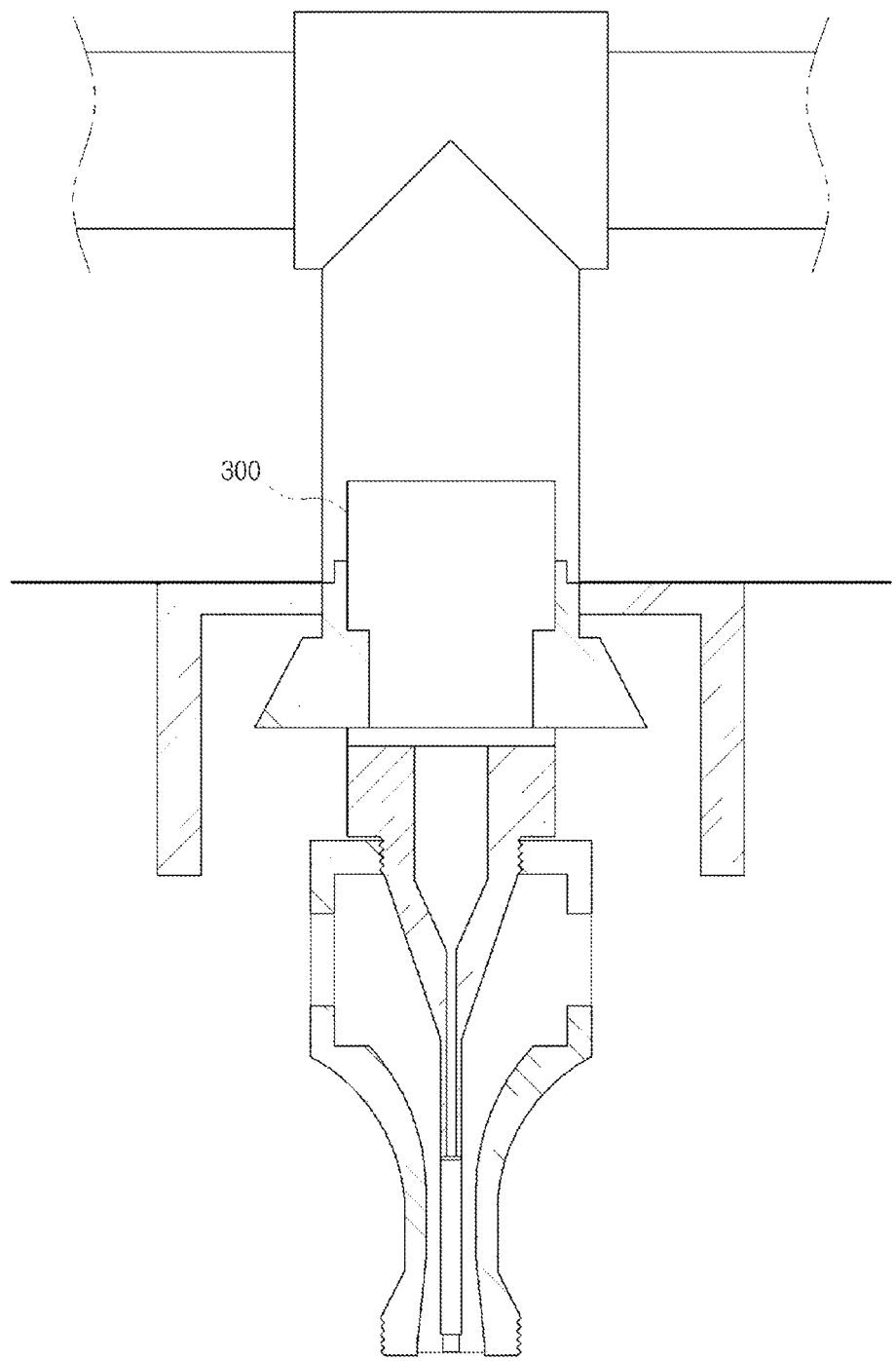
FIG. 19 illustrates an attachment method smoke and poisonous gas removing apparatus according to an embodiment of the present invention.

FIG. 19 illustrates an attachment method smoke and poisonous gas removing apparatus according to an embodiment of the present invention.

As illustrated in FIG. 19, the smoke and poisonous gas removing apparatus may be mounted on a pipe by using a quick coupler 300 which is opened by being connected to a connection portion between the smoke and poisonous gas removing apparatus and the pipe. The quick coupler 300 enables the smoke and poisonous gas removing apparatus to be easily attached or detached, and moreover, when water should be partially turned off after fire is extinguished, the water may be easily turned off by separating the body from the smoke and poisonous gas removing apparatus.

Moreover, the smoke and poisonous gas removing apparatus may be applied to the nozzle of a fire hose.

Figure 20:
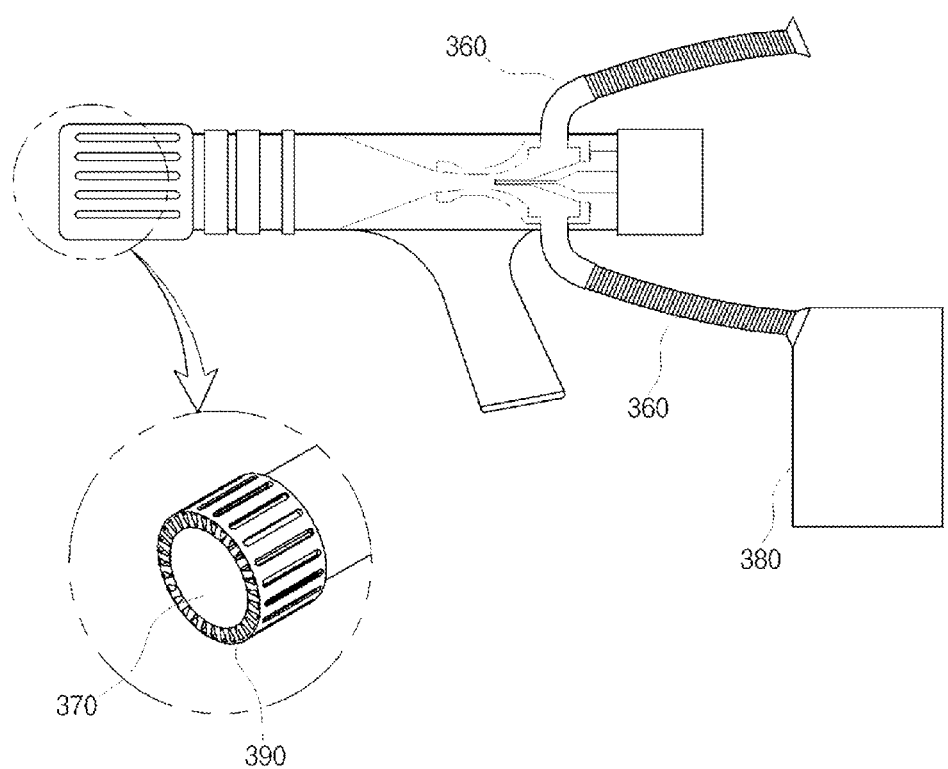
FIG. 20 illustrates a fire hose nozzle according to an embodiment of the present invention.

FIG. 20 illustrates a fire hose nozzle according to an embodiment of the present invention.

As illustrated in FIG. 20, an ejector structure may be inserted into the fire hose nozzle as illustrated in FIG. 1, and a pipe 360 may be provided at a suction part. Therefore, the fire hose nozzle may be used to remove smoke or to mix different fire extinguishing agents.

When water is sprayed through a fire hose in the state of not being connected to the pipe 360, air including poisonous materials may be sucked through the pipe 360, and the poisonous materials may be mixed with water and sprayed again.

On the other hand, when the pipe 360 is connected to a tube 380 containing a different fire extinguishing agent, the fire extinguishing agent may be sucked through the pipe 360 and sprayed along with water. That is, depending on conditions, a fire extinguishing agent may be quickly changed and may be directly mixed with fire extinguishing water in a fire nozzle, whereby the fire extinguishing agent may be sprayed at the original point of ignition at a location of fire (poisonous gas may be sucked and sprayed along with water). Also, dry sand that is an all-powerful fire extinguishing agent may be sucked through the pipe 360 by using compressed air or a fire extinguishing gas (halon gas), and may be sprayed on a fire source as if water is sprayed (dry sand is dried sand and may be applied to general, oil, electricity, and metal fire by suffocation action). In addition to the dry sand, expanded vermiculite, expanded perlite or sodium sawdust may be sprayed.

Moreover, as illustrated in FIG. 14, a lighting lamp 390 may be provided at a spraying port 370 of the fire nozzle of FIG. 20, and may be used to secure a field of view when extinguishing fire. As described above, in order to turn on the lighting lamp 390, electricity may be generated by using both a force of air and a force of water inserted to the fire nozzle instead of a force of air sucked into the suction part.

The smoke and poisonous gas removing apparatus according to an embodiment of the present invention may be applied to a fire mask for preventing poisonous gas.

Figure 21:
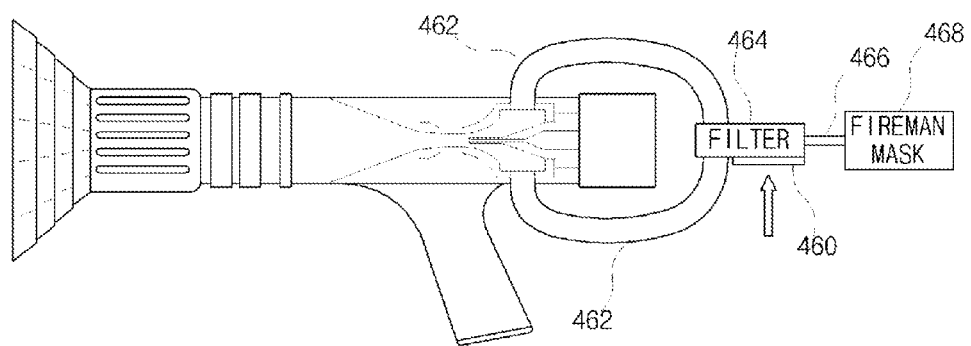
FIG. 21 illustrates a poisonous gas prevention fire mask to which the Jabara-type multi-stage ring of FIG. 6 is attached, according to an embodiment of the present invention.

FIG. 21 illustrates a poisonous gas prevention fire mask to which the Jabara-type multi-stage ring of FIG. 6 is attached, according to an embodiment of the present invention.

As illustrated in FIG. 21, the ejector structure of FIG. 1 may be provided at a nozzle of a fire hose similar to FIG. 20, a suction part 460 is provided so that a vacuum generation unit may be connected to a pipe 462 and poisonous gas is sucked toward poisonous gas removing filter 464 in knapsack types which are wearable on backs of firemen.

Sucked air is purified through the filter 464, and the purified air is supplied to firemen through a pipe 466 connected to a fireman mask 468.

Therefore, firemen may enter a fire in the state of carrying a knapsack-type light filter box on the fireman's back, instead of an air tank, the filter box may suck in and purify air of the fire, and the fireman may breathe by using the purified air.

Moreover, a multi-stage ring may be attached to a spraying part of a nozzle, thereby reinforcing a function of sucking and purifying ambient air including poisonous gas.

A suction fan for sucking in poisonous gas may be additionally provided for further reinforcing a smoke removal function.

Figure 22:
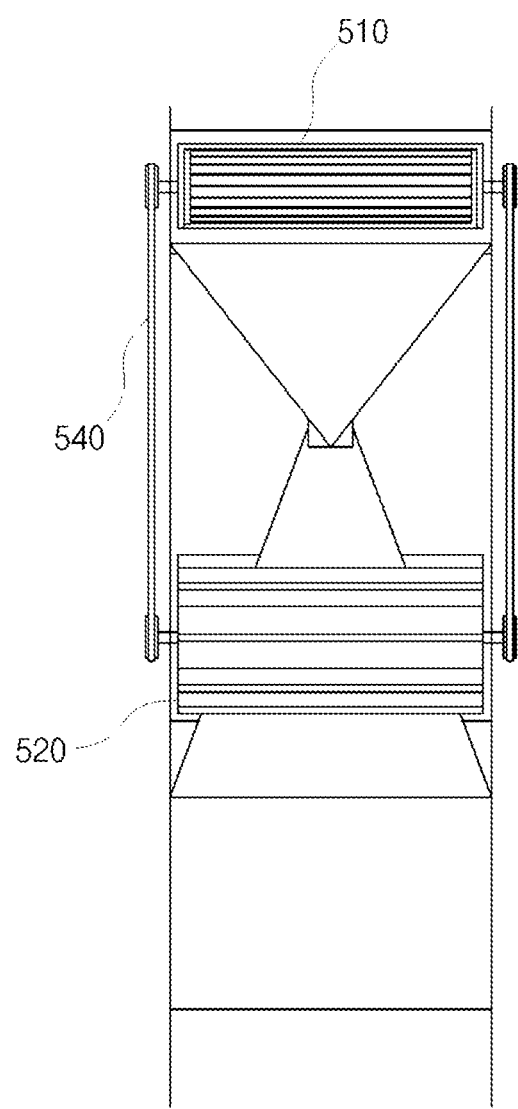
FIG. 22 is a cross-sectional view of smoke and poisonous gas removing apparatus in which the suction fan is provided for enhancing the smoke suction force, according to another embodiment of the present invention.
Figure 23:
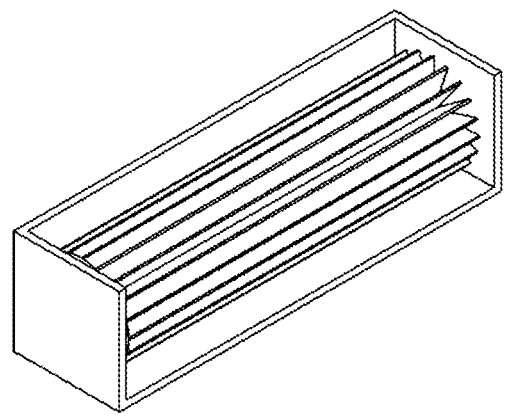
FIG. 23 is an enlarged view of the suction fan of FIG. 22.
Figure 24:
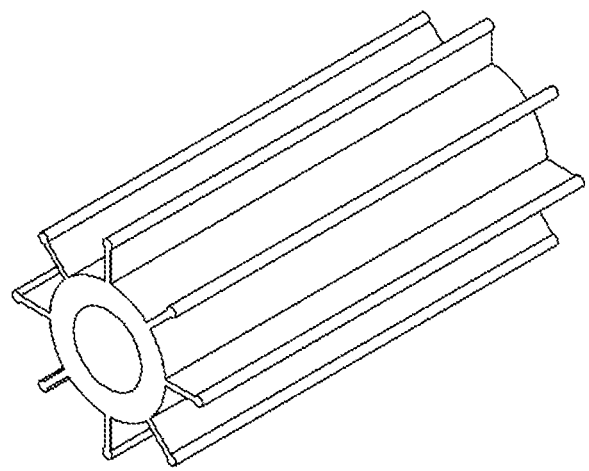
FIG. 24 is an enlarged view of an impeller of FIG. 22.

FIG. 22 is a cross-sectional view of smoke and poisonous gas removing apparatus in which the suction fan is provided for enhancing the smoke suction force, according to another embodiment of the present invention. FIG. 23 is an enlarged view of the suction fan of FIG. 22. FIG. 24 is an enlarged view of an impeller of FIG. 22.

As illustrated in FIG. 22, the smoke and poisonous gas removing apparatus according to another embodiment of the present invention includes an impeller 520, which is provided in the direction to which water sprayed from the nozzle flows, and a suction fan 510 that is connected to the impeller 520 through belt 540.

In this case, when fire occurs, since water is sprayed through the nozzle, the impeller 520 is rotated by water pressure, and the suction fan 510 connected to the belt 540 is rotated according to the rotation of the impeller 520, thereby inducing suction of poisonous gas through the suction part. In the smoke and poisonous gas removing apparatus according to an embodiment of the present invention illustrated in FIGS. 22 to 24, in addition to the suction effect based on generation of a vacuum state of an ejector structure, the suction effect based on the suction fan 510 is added, and thus, the suction force increases, thereby increasing the effect of removing poisonous gas.

Moreover, the nozzle part of the smoke and poisonous gas removing apparatus according to an embodiment of the present invention may be filled with water before operation. In this case, when it gets cold, the nozzle part may freeze and burst.

To solve such problem, in another embodiment of the present invention, a vacuum part may be provided near the flux unit and nozzle to provide a heat-insulating effect, and thus, freeze and burst can be prevented.

Figure 25:
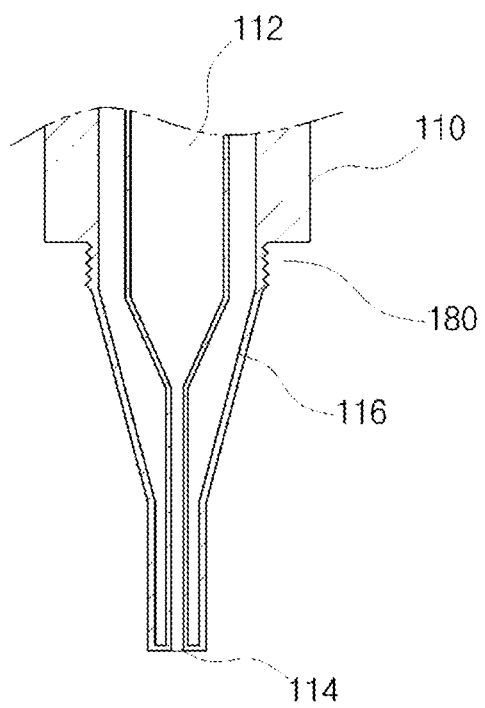
FIG. 25 is a view illustrating the vacuum state for preventing freeze and burst of the body nozzle of smoke and poisonous gas removing apparatus according to another embodiment of the present invention.

FIG. 25 is a view illustrating the vacuum state for preventing freeze and burst of the body nozzle of smoke and poisonous gas removing apparatus according to another embodiment of the present invention.

As illustrated in FIG. 25, a space is formed around flux unit 112 and nozzle 114, and a vacuum part 116 maintaining a vacuum state is formed. When the vacuum part 116 is formed, although water is filled in the flux unit 112 and nozzle 114 and the ambient temperature falls down below zero, the water filled in the flux unit 112 and nozzle 114 is not frozen due to a heat-insulating effect obtained by the vacuum part 116, and thus, the smoke and poisonous gas removing apparatus can be prevented from freezing and bursting. In particular, fire frequently occurs in winter, and thus, a method of preventing the freeze and burst of sprinklers is necessary. Therefore, the vacuum part 116 of FIG. 25 may be used for this method.

The smoke and poisonous gas removing apparatus according to an embodiment of the present invention may be applied as a smoke remover which is separately provided at corridors or stairs.

Figure 26:
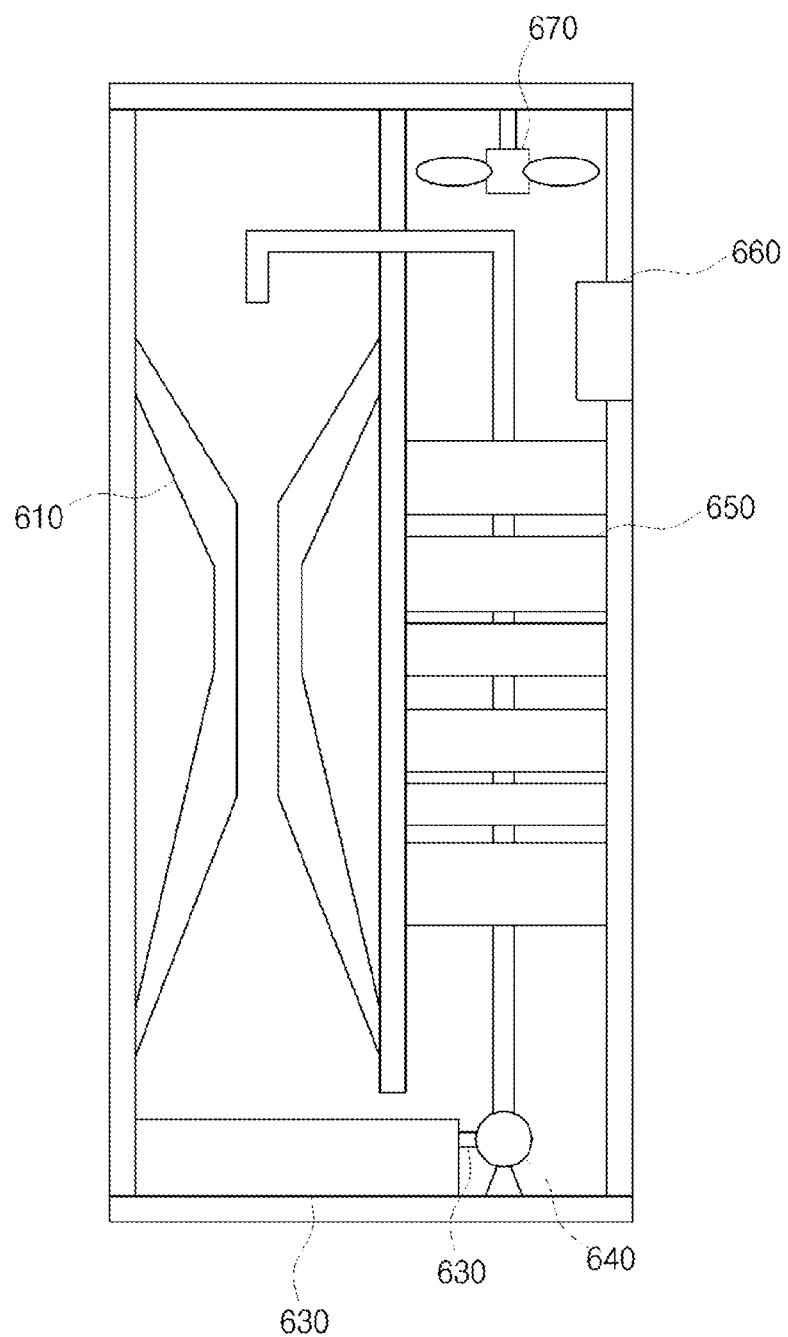
FIG. 26 illustrates smoke and poisonous gas removing apparatus according to another embodiment of the present invention.

FIG. 26 illustrates smoke and poisonous gas removing apparatus according to another embodiment of the present invention.

As illustrated in FIG. 26, when water is supplied through a frame 610 configuring a venturi, a suction part (not shown) disposed on the frame 610 sucks external air, and the sucked air is mixed with water sprayed from an upper portion and is discharged to a storage unit 630. The water is collected in the storage unit 603 and is again supplied to the frame 610 through a circulation pump 640, and air which is mixed with water and from whichever water-soluble foreign materials are removed passes through a filter 650, which is illustrated at the right of the drawing, to become clean air from which pollutants are removed.

Clean air, from which polluted water is removed, may be discharged to outside the smoke and poisonous gas removing apparatus. However, a mask 600 may be equipped in the smoke and poisonous gas removing apparatus, clean air may be discharged to the mask 600 and a user evacuating from fire may suck the clean air through the mask 600.

In order to reinforce an air suction function, an exhaust fan 670 may be additionally provided, and although not shown, a suction fan and impeller which are illustrated in FIGS. 22 to 24 may be additionally provided, thereby increasing the suction force.

The smoke and poisonous gas removing apparatus according to an embodiment of the present invention may be applied as humidifiers or air cleaners.

Figure 27:
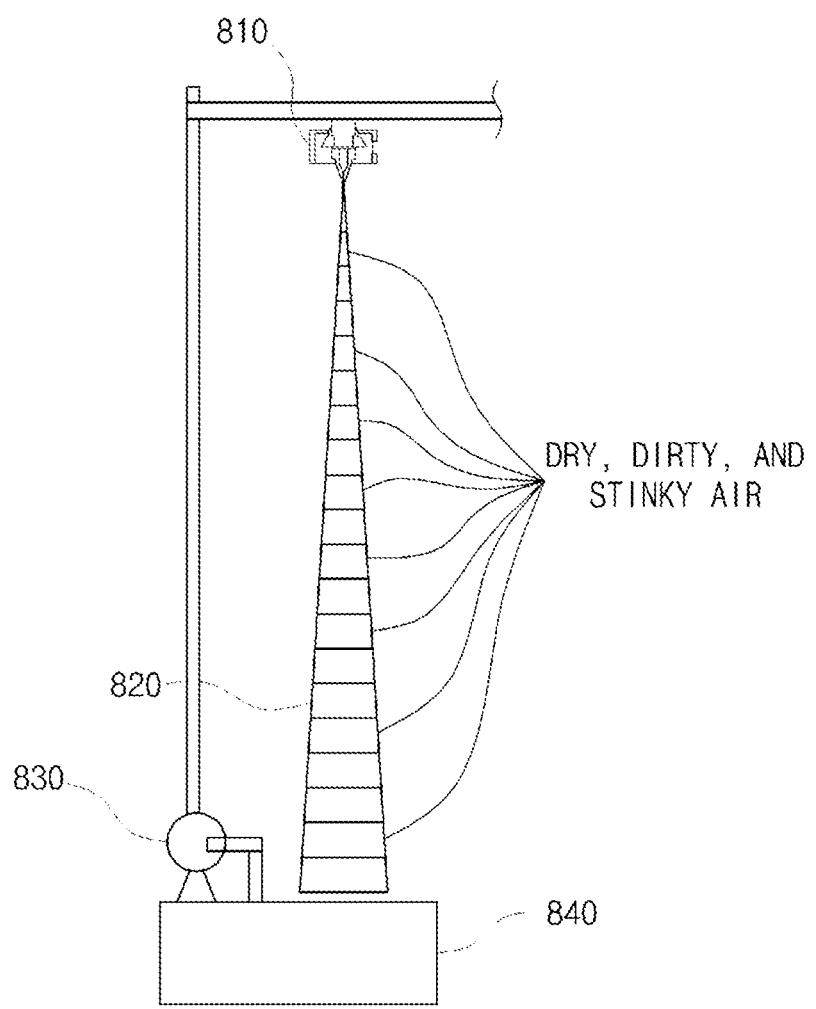
FIG. 27 illustrates a humidifier using smoke and poisonous gas removing apparatus according to an embodiment of the present invention.

FIG. 27 illustrates a humidifier using smoke and poisonous gas removing apparatus according to an embodiment of the present invention.

As illustrated in FIG. 27, smoke and poisonous gas removing apparatus 810 may be provided at an upper side, and a Jabara-type multi-stage ring 820 may be provided under the smoke and poisonous gas removing apparatus 810. In this case, the Jabara-type multi-stage ring 820 may be provided as a suitable number depending on the case.

The smoke and poisonous gas removing apparatus 810 operates, and when dry and odorous air is sucked through the suction part (not shown) between stages of the Jabara-type multi-stage ring 820, pollutants may be mixed with water sprayed through the nozzle and may be dropped downward. Therefore, wet, clean and odor-less air may be generated and discharged to the outside through a lower portion of the Jabara-type multi-stage ring 820.

In this case, a method of spraying water through the nozzle may use a spray method unlike the smoke and poisonous gas removing apparatus which is used to extinguish fire.

Moreover, water mixed with pollutants is not sprayed like smoke and poisonous gas removing apparatus which is used to extinguish fire, and is collected and circulated. To this end, tank 840 may be provided under the Jabara-type multi-stage ring 820.

Therefore, air from which pollutants are removed may be discharged to the outside, and water mixed with pollutants may be collected in the tank 840. The collected water may be circulated through pump 830, may rise along a tube and may be sprayed to the Jabara-type multi-stage ring 820 through the smoke and poisonous gas removing apparatus 810. Also, when the water collected in the tank 840 is polluted water mixed with pollutants, the smoke and poisonous gas removing apparatus 810 may further include a filter (not shown) that removes pollutants before collected water is circulated.

The smoke and poisonous gas removing apparatus according to an embodiment of the present invention may be applied as a dust removal and preventive drug spray device.

Figure 28:
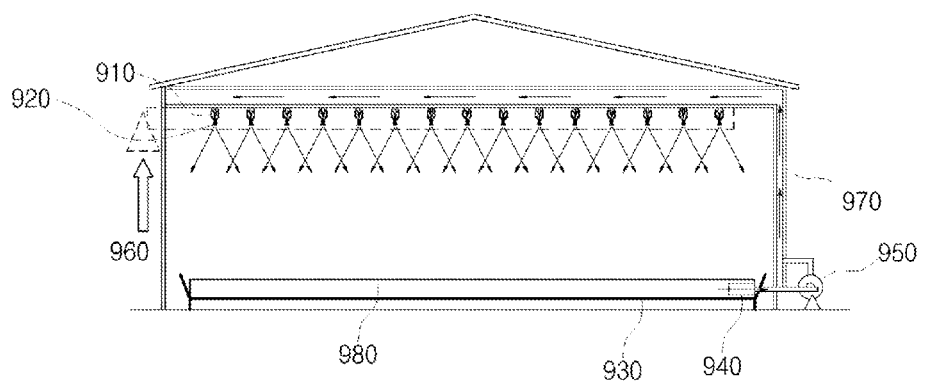
FIG. 28 illustrates a dust removal and preventive drug spray device using smoke and poisonous gas removing apparatus according to an embodiment of the present invention.

FIG. 28 illustrates a dust removal and preventive drug spray device using smoke and poisonous gas removing apparatus according to an embodiment of the present invention.

FIG. 28 illustrates a dust removal and preventive drug spray device which is provided as a gate type at an entrance of a livestock shed or on a road in a restricted area. A plurality of smoke and poisonous gas removing apparatuses 910 may be provided on the dust removal and preventive drug spray device and may spray water or drugs. Ambient air is sucked when water or drugs are sprayed and water or drugs may be mixed with various dusts included in the air.

Sprayed water or drugs may be collected in a storage unit 930 which is provided on the bottom, and the collected water or drug 980 may be circulated through pump 950, and may be supplied to the smoke and poisonous gas removing apparatus 910 along tube 970, thereby saving water or drugs. Also, the smoke and poisonous gas removing apparatus 910 may further include a filter 940 that removes pollutants contained in the collected water or drugs 980.

The smoke and poisonous gas removing apparatus 910 may be provided to be opened, and a suction part 960 may be provided at a specific position (a livestock shed or the like). The suction part 960 may be connected to a pipe, and thus may continuously suck and purify air at a specific area.

Hereinafter, a smoke removing sprinkler according to another embodiment of the present invention will be described in detail with reference to the accompanying drawings.

Figure 29:
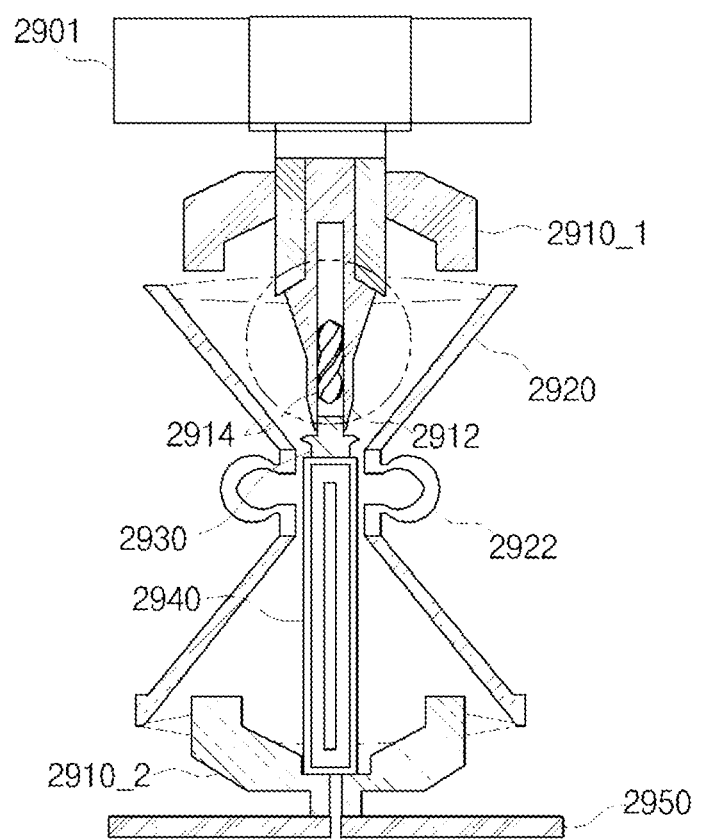
FIG. 29 is a cross-sectional view of a smoke removing sprinkler according to an embodiment of the present invention.
Figure 30:
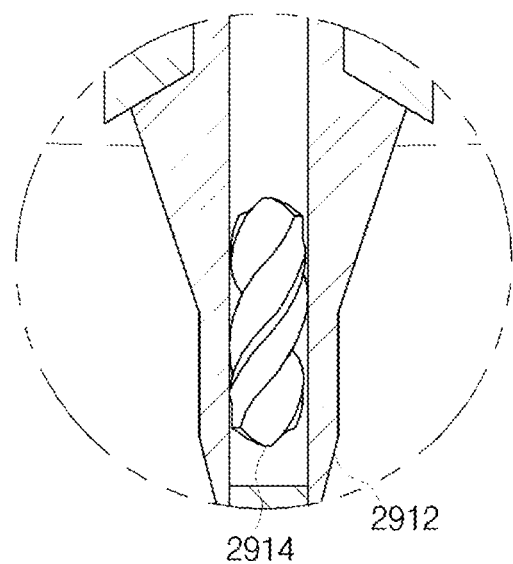
FIG. 30 is an enlarged cross-sectional view of the nozzle section of a smoke removing sprinkler according to an embodiment of the present invention.

FIG. 29 is a cross-sectional view of a smoke removing sprinkler according to an embodiment of the present invention. FIG. 30 is an enlarged cross-sectional view of the nozzle section of a smoke removing sprinkler according to an embodiment of the present invention.

As illustrated in FIG. 29, the smoke removing sprinkler according to an embodiment of the present invention includes: various frames 2910_1 and 2910_2 that are connected to the pipe section 2901 which supplies water when fire occurs, and configures a framework of the smoke removing sprinkler; a nozzle 2912 that sprays water supplied from the pipe section 2901; a mixing chamber 2920 in which water sprayed through the nozzle 2912 is mixed with smoke; a heat sensitive unit 2940 that is fixed to seal the nozzle 2912 in a normal state; a sealing unit 2930 that is disposed between the heat sensitive unit 2940 and the nozzle 2912; and a deflector 2950 that disperses the water and smoke mixed in the mixing chamber 2920 to discharge the water and smoke.

The frames 2910_1 and 2910_2 and the mixing chamber 2920 are formed of metal materials. When fire occurs, smoke and poisonous gas are sucked through a gap between the frame 2910_1 and mixing chamber 2920.

The heat sensitive unit 2940 may use a meltable heat sensitive unit including a small amount of metal which is melted at a setting temperature, or use a rupturable heat sensitive unit including a glass bulb with a small amount of liquid and good heat expandability.

As illustrated in FIGS. 29 and 30, a rotary blade 2914 that forms a vortex flow of water sprayed through the nozzle 2912 is included in nozzle 2912. Due to the rotary blade 116, the flow of water supplied from the pipe section 2901 is changed from linear flow to vortex flow and is discharged through the nozzle 2912.

The mixing chamber 2920 sucks smoke and poisonous gas by using a venturi effect even without consuming separate energy, and dissolves the smoke and poisonous gas in water discharged through the nozzle 2912 or collects the smoke and poisonous gas, thereby removing the smoke and poisonous gas.

According to Bernoulli's theorem, when fluid moves on a horizontal plane and when there is no change in potential energy, reduction in the fluid pressure denotes an increase in a flow velocity. For example, when fluid flows through a conduit of which a cross-sectional area is changed on the horizontal plane, the cross-sectional area of the conduit decreases, and thus, the flow velocity increases. Therefore, pressure of fluid acting on the conduit is the lowest at the portion in which the cross-sectional area of the conduit is at its minimum. Accordingly, an internal pressure of the mixing chamber is reduced, and thus, external gas is sucked in.

In a closed sprinkler, the inlet is closed at a normal state, and when fire occurs, the inlet is opened by heat which is generated by fire. To this end, in components which are assembled in compressed structure by the meltable fuse of special alloy or glass bulbs, a fuse starts to be changed at an ambient temperature, and when reaching an operating temperature, the assembled components are disassembled and allow water to be sprayed from the ceiling.

The basic principle in which a closed venturi smoke removing sprinkler starts to operate is the same as that of a general sprinkler.

When a sprinkler operates, high-speed water (firefighting water) sprayed from the nozzle 2912 with a built-in vortex inductor 2914 flows to an inlet of the mixing chamber (a mixing diffuser) 2920 which has a venturi tube shape and is disposed under the body of frame 2910_1 and is sprayed. A negative pressure, which is explained in the Bernoulli's theorem, is generated in a space between the nozzle 2912 and the mixing chamber 2920 to form a vacuum state and suction is performed.

The mixing chamber 2920 is provided for the space having a shape of a ring doughnut 2922 in the center, an eddy is generated by the vortex effect and smoke is more efficiently mixed with water.

When fire occurs, smoke moves to the indoor ceiling, and pressure of hot air continuously increases at the indoor ceiling. When fire occurs, the smoke layer is hot, light and has higher pressure compared to general air and thus rises to the ceiling. Since smoke moves from a high-pressure position to a low-pressure position, the present invention allows smoke to be automatically sucked into a creased venturi tube structure without separate additional device.

According to another embodiment of the present invention, two or more spaces having the shape of a ring doughnut may be formed in the mixing chamber.

Figure 31:
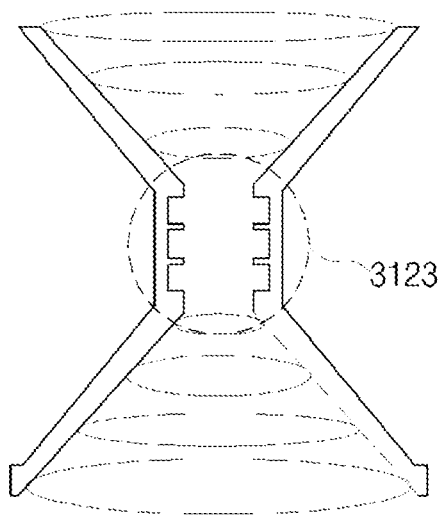
FIG. 31 is a cross-sectional view illustrating the mixing chamber of smoke removing sprinklers according to another embodiment of the present invention.

FIG. 31 is a cross-sectional view illustrating the mixing chamber of smoke removing sprinklers according to another embodiment of the present invention.

As illustrated in FIG. 31, in order for the mixing chamber to have three spaces having the shape of a ring doughnut, creased tube 3123 is provided at the center. Therefore, an eddy is generated by the vortex effect in an area with the ring doughnut shape, of the creased tube 3123, and thus, smoke is more efficiently mixed with water.

Figure 32:
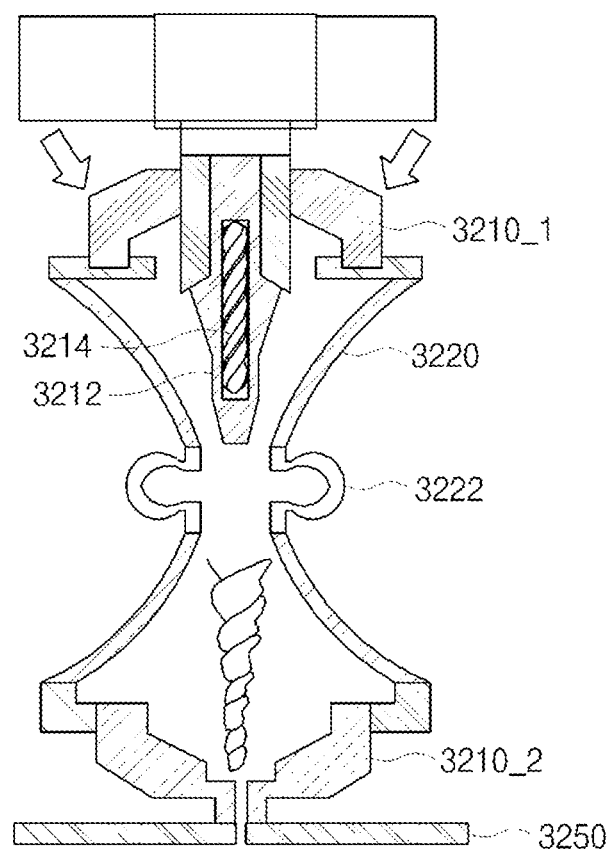
FIG. 32 is a cross-sectional view illustrating a smoke removing sprinkler according to another embodiment of the present invention and illustrates a smoke removing sprinkler having a closed sprinkler structure unlike the smoke removing sprinkler of FIG. 29 which has a closed sprinkler structure.

FIG. 32 is a cross-sectional view illustrating a smoke removing sprinkler according to another embodiment of the present invention and illustrates a smoke removing sprinkler having a closed sprinkler structure unlike the smoke removing sprinkler of FIG. 29 which has a closed sprinkler structure.

As illustrated in FIG. 32, the basic structure is similar to the embodiment of FIG. 29, but a sealing unit and a heat sensitive unit are not provided.

Moreover, in the smoke removing sprinkler according to the present embodiment, a mixing chamber may be provided to have various shapes.

Figure 33:
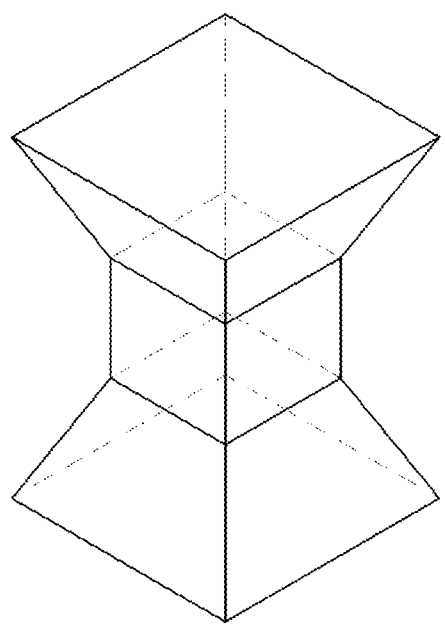
FIG. 33 is a view illustrating the configuration of a mixing chamber according to another embodiment of the present invention.

FIG. 33 is a view illustrating the configuration of a mixing chamber according to another embodiment of the present invention.

In the embodiments of FIGS. 29 to 32, a cross-sectional surface of the mixing chamber is formed to have a circular shape, but in the embodiment of FIG. 33, a cross-sectional surface of the mixing chamber is formed to have a tetragonal shape. In this case, when the deflector having a tetragonal structure is provided under the mixing chamber, water is effectively sprayed on all corners of a tetragonal room.

Figure 34:
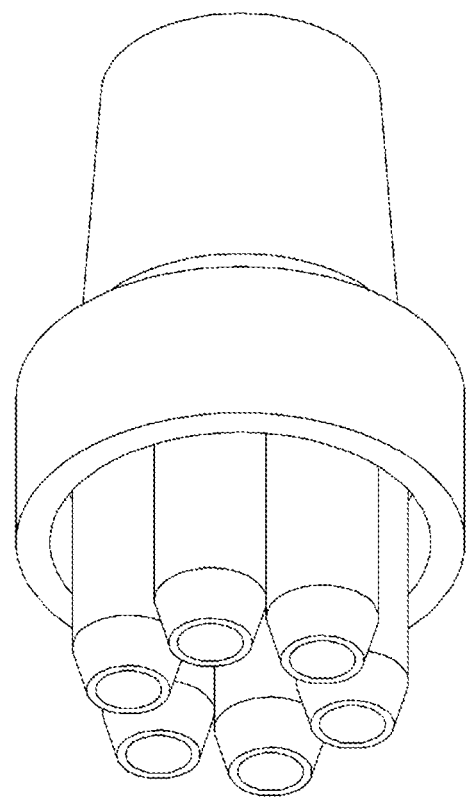
FIG. 34 illustrates the state in which various nozzles are coupled to one frame.

A smoke removing sprinkler, in which two or more nozzles and a mixing chamber are coupled to one frame, may be provided. FIG. 34 illustrates the state in which the plurality of nozzles are coupled to one frame. In FIG. 34, six nozzles may be provided, and by coupling a mixing chamber (venturi tube) to the lower side of each of the six nozzles, the smoke removing sprinkler may be implemented.

Figure 35:
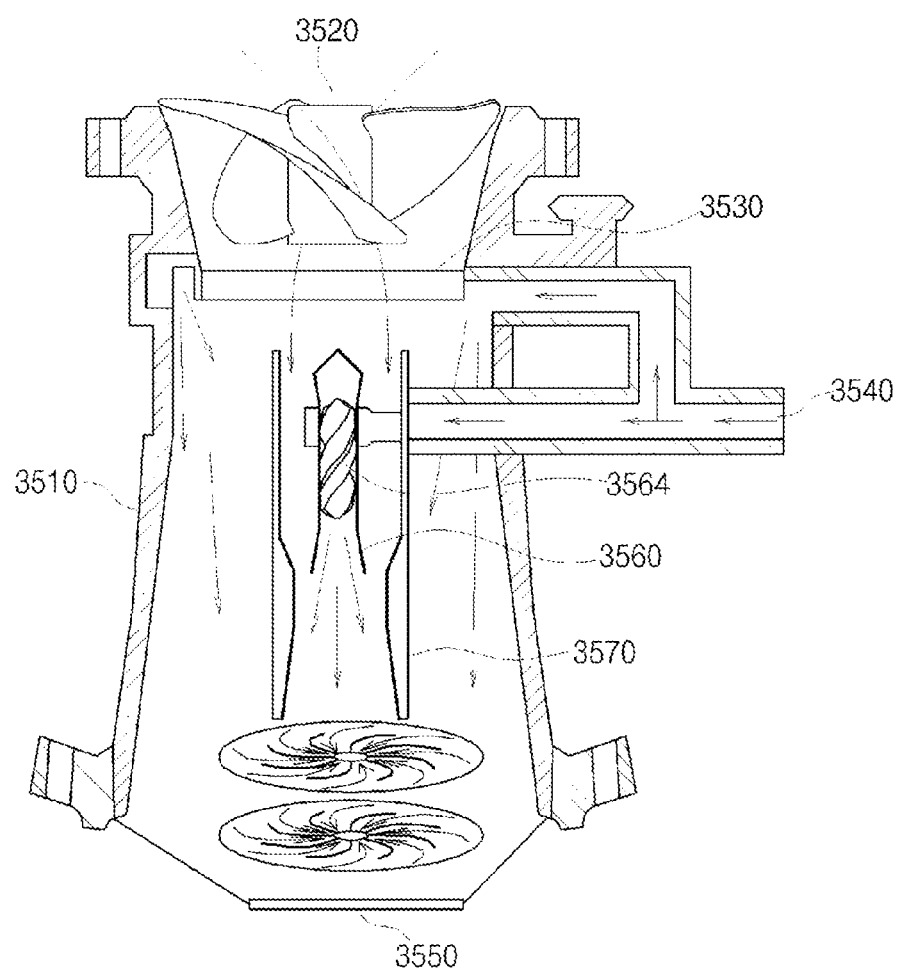
FIG. 35 illustrates a mobile apparatus for removing smoke and poisonous gas according to another embodiment of the present invention.

FIG. 35 illustrates a mobile apparatus for removing smoke and poisonous gas according to an embodiment of the present invention.

As illustrated in FIG. 35, the mobile apparatus for removing smoke and poisonous gas according to an embodiment of the present invention includes a body venturi tube 3510, an air vortex inductor 3520, a vortex circular inductor 3530, a pipe section 3540, a vortex nozzle 3560 and a nozzle venturi tube 3570. The deflector 3550, which sprays and disperses water mixed with smoke and a poison gas, is provided under the body venturi tube 3510, and is not an essential element but is optional. Also, as described above, the body venturi tube 3510 and the nozzle venturi tube 3570 may be provided to have one or more spaces having the shape of a ring doughnut.

Figure 36:
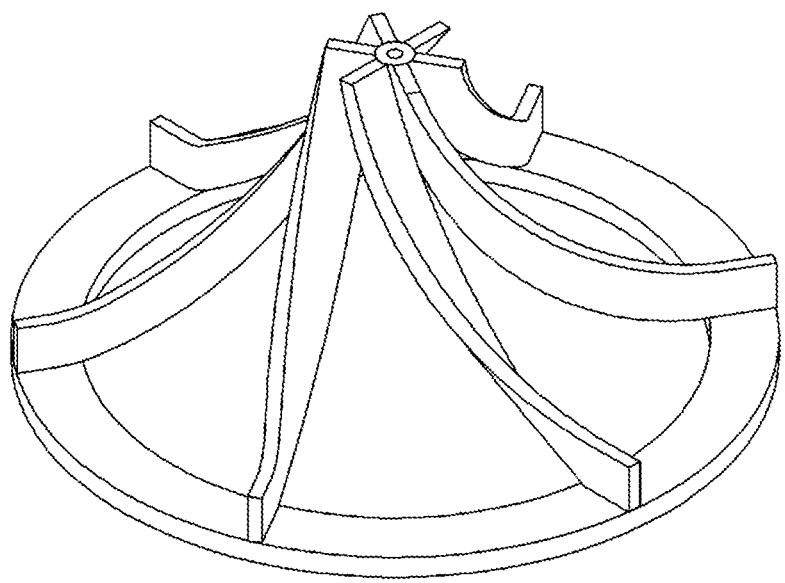
FIG. 36 is an enlarged view of an air vortex inductor of FIG. 35.
Figure 37:
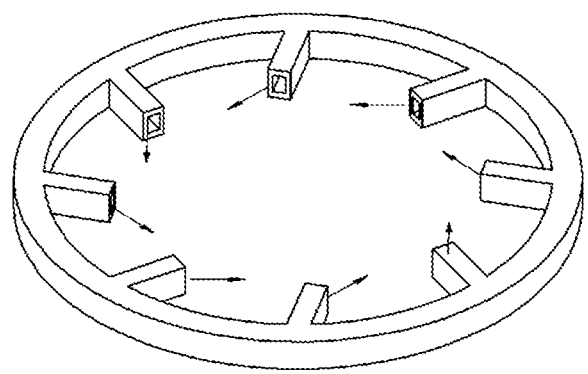
FIG. 37 is an enlarged view of a vortex circular inductor of FIG. 35.

FIG. 36 is an enlarged view of an air vortex inductor of FIG. 35. FIG. 37 is an enlarged view of a vortex circular inductor of FIG. 35.

Referring to FIGS. 35 to 37, when fire occurs, smoke, poisonous gas, and fine dust which are hot and have high pressure move to the ceiling, pass through the air vortex inductor 3520 of smoke and poisonous gas removing apparatus according to the present embodiment to form a spiral eddy and are sucked in. The suction force of the smoke and poisonous gas removing apparatus increases more due to water, which is secondarily sprayed as a spiral eddy in a diagonal direction through the vortex circular inductor 3530, and water which is tertiarily sprayed as a spiral eddy in a diagonal direction through a vortex inductor 3564 included in the vortex nozzle 3560. Therefore, like the principle of an air amplifier that sucks and amplifies external air by about 15 times, smoke and poisonous gas are sucked and amplified, mixed with sprayed vortex water and dissolved in water. In this way, smoke, poisonous gas and dust are removed.

The vortex nozzle is provided in variety, and thus, the suction force of the smoke and poisonous gas removing apparatus increases.

Figure 38:
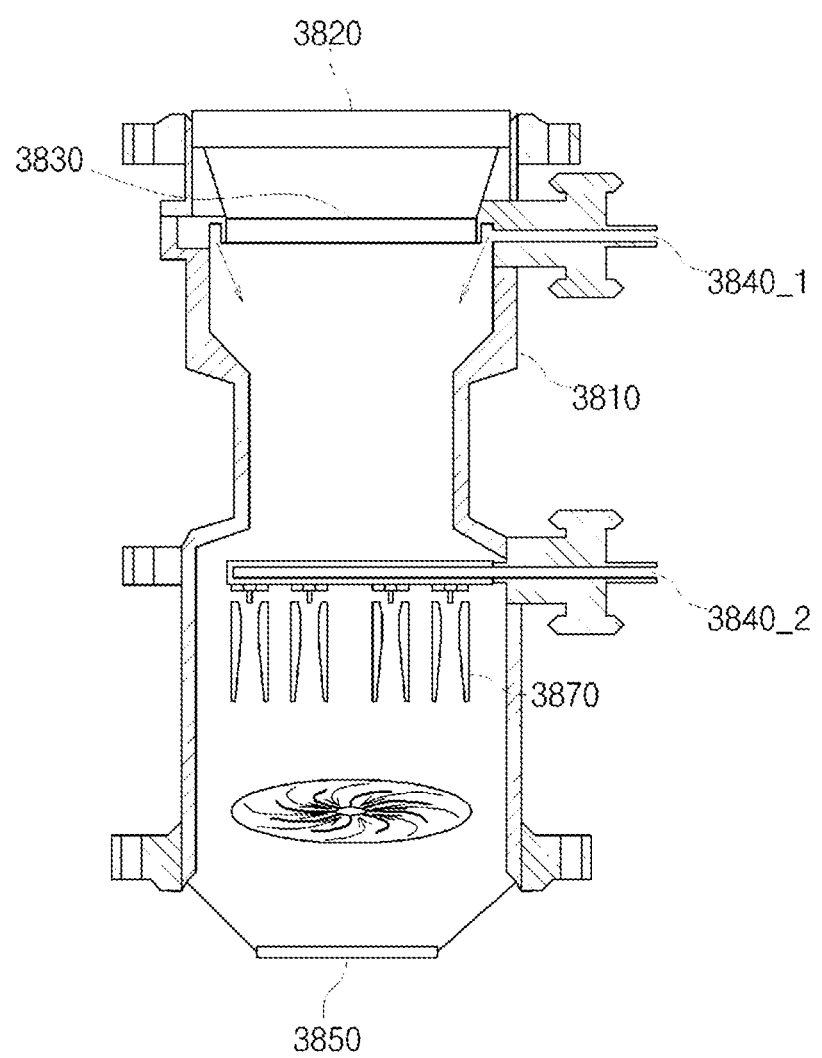
FIG. 38 is a cross-sectional view of a mobile smoke and poisonous gas removing apparatus including various vortex nozzles according to an embodiment of the present invention.

FIG. 38 is a cross-sectional view of a mobile smoke and poisonous gas removing apparatus including various vortex nozzles according to an embodiment of the present invention.

As illustrated in FIG. 38, by using the plurality of nozzles, water is sprayed on various nozzle venturi tubes 3870 through a pipe section 3840_2, and thus, the suction force increases.

Figure 39:
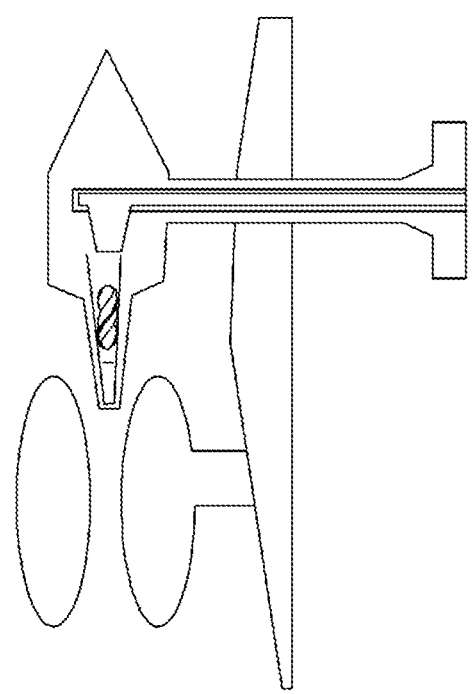
FIG. 39 is a cross-sectional view illustrating a structure in which a vortex generating unit is provided in a nozzle.

A vortex nozzle of the smoke and poisonous gas removing apparatus according to the present embodiment, as described above, is implemented by providing a vortex generating unit in the nozzle. FIG. 39 is a cross-sectional view illustrating a structure in which a vortex generating unit is provided in a nozzle.

A body part under the nozzle may be provided in a multi-stage ejector structure.

Figure 40:
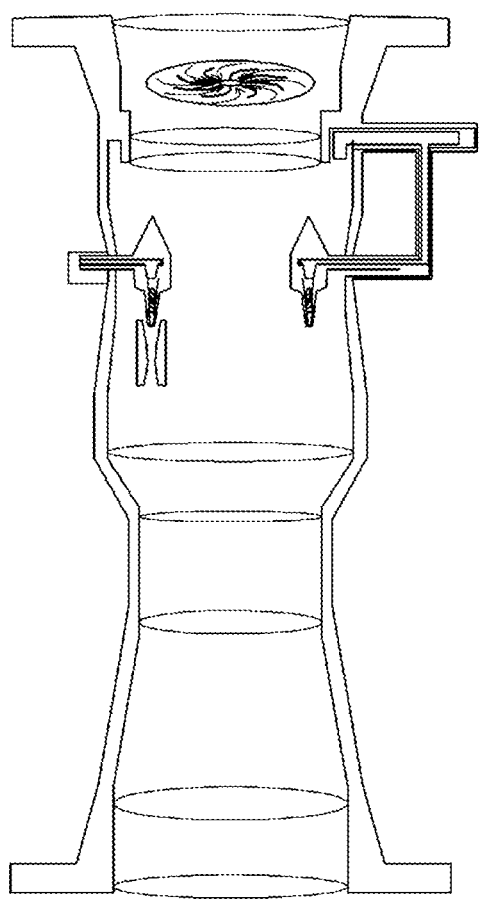
FIG. 40 illustrates a mobile smoke and poisonous gas removing apparatus of which the body has a spring-type multi-stage ejector structure, according to an embodiment of the present invention.

FIG. 40 illustrates a mobile smoke and poisonous gas removing apparatus of which the body has a spring-type multi-stage ejector structure, according to an embodiment of the present invention.

As illustrated in FIG. 40, smoke and poisonous gas are sucked through the gap between stages of a multi-stage ejector, and thus, a throughput of the smoke and poisonous gas increases.

Moreover, in order to increase the suction force, a vortex circular inductor for rotating water may be provided as two or more.

Figure 41:
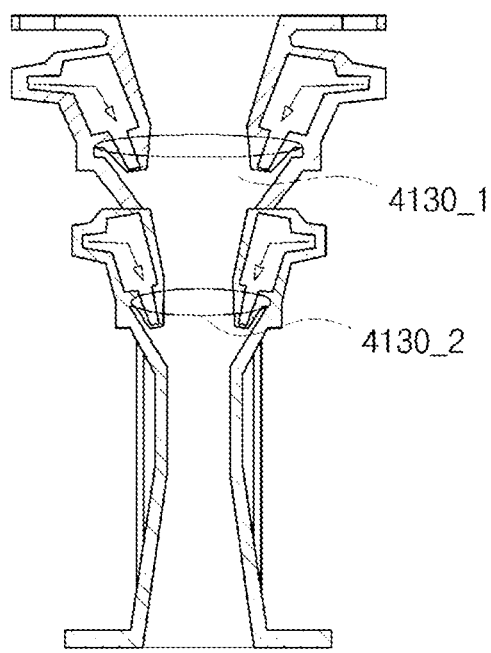
FIG. 41 illustrates a mobile smoke and poisonous gas removing apparatus in which a vortex circular inductor is provided at multi-stage, according to an embodiment of the present invention.

That is, as illustrated in FIG. 41, the vortex circular inductor may be provided in multi-stages.

When a two-stage or three-stage vortex circular inductor is provided, high-speed water which is doubly and triply sprayed from various diagonally fixed nozzles is diagonally sprayed from the edge of the body to form one to three vortex waterspout rotators in the body, and is discharged downwardly.

Figure 42:
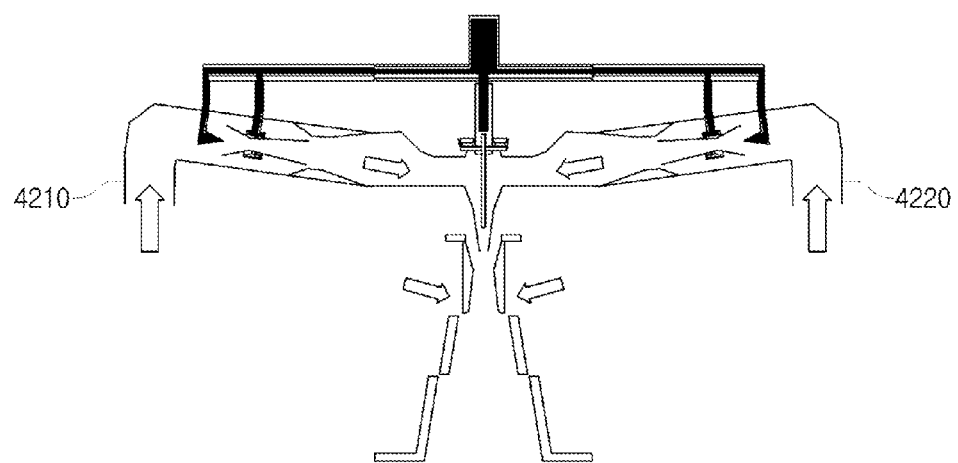
FIG. 42 illustrates smoke and poisonous gas removing apparatus according to another embodiment of the present invention and illustrates an embodiment in which smoke and poisonous gas in a different space are removed by using a long-connected pipe.

FIG. 42 illustrates smoke and poisonous gas removing apparatus according to another embodiment of the present invention and illustrates the embodiment in which smoke and poisonous gas in a different space are removed by using long-connected pipes 4210 and 4220.

Figure 43:
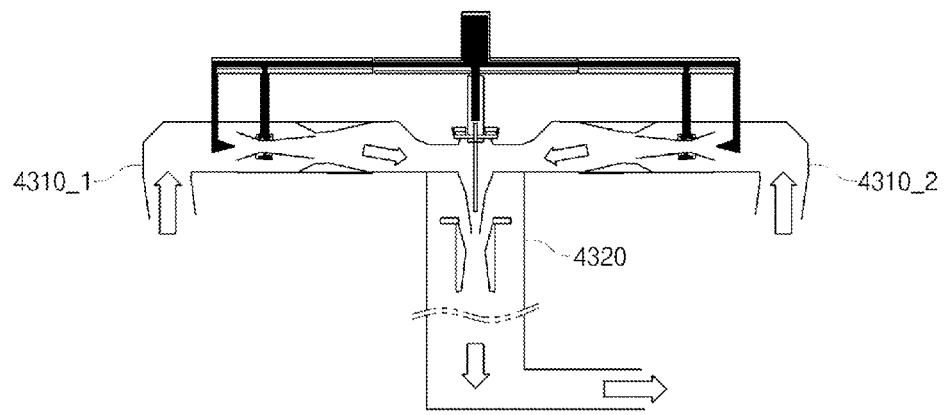
FIG. 43 illustrates smoke and poisonous gas removing apparatus according to another embodiment of the present invention and illustrates an embodiment in which smoke and poisonous gas in different areas are removed by using a long-connected pipe, and waste water is processed at a different area by using a long-connected pipe.

FIG. 43 illustrates smoke and poisonous gas removing apparatus according to another embodiment of the present invention and illustrates the embodiment in which smoke and poisonous gas in different areas are removed by using long-connected pipes 4310_1 and 4310_2, and waste water is processed at a different area by using a long-connected pipe 4320.

According to the embodiment of FIG. 42 or 43, in computer rooms or electricity rooms in which water cannot be sprinkled directly, a suction part extends and sucks smoke, poisonous gas and fine dust. The suction part is connected to the discharging pipe at a separate area with a draining port and drains treated water.

Figure 44:
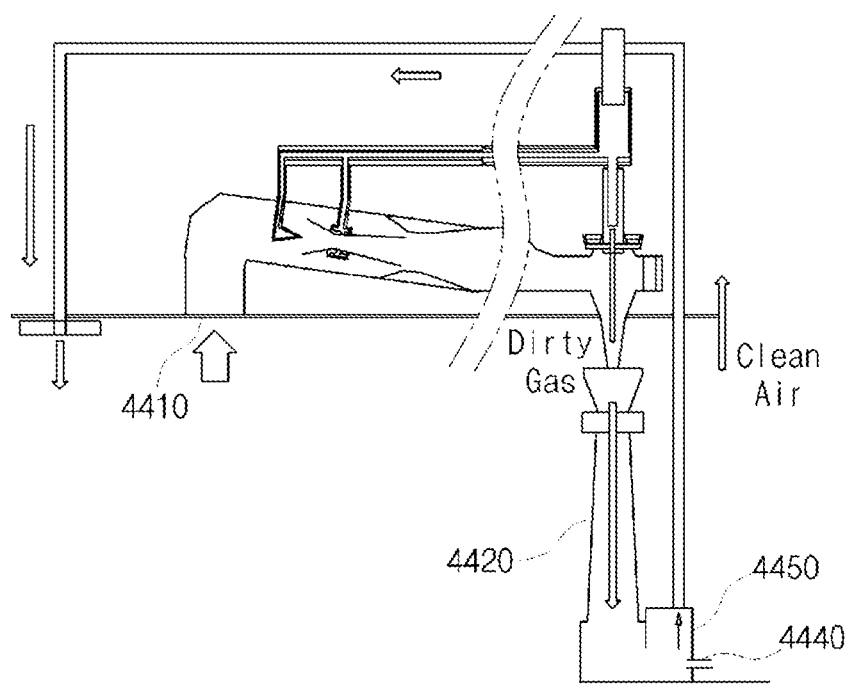
FIG. 44 illustrates smoke and poisonous gas removing apparatus according to another embodiment of the present invention, and illustrates an embodiment for resupplying clean air.

FIG. 44 illustrates smoke and poisonous gas removing apparatus according to another embodiment of the present invention, and illustrates an embodiment for resupplying clean air.

As illustrated in FIG. 44, a tank 4450 is provided in front of a draining port 4440, air and water mixed with poisonous gas and smoke are collected in the tank 4450 and water is drained through the draining port 4440. Clean air is resupplied to the area (from which smoke and poisonous gas are sucked) with a certain distance from a suction port 4410 of the smoke and poisonous gas removing apparatus, and thus the indoor air pressure of the area from which smoke and poisonous gas are sucked in is identically adjusted, thereby allowing the smoke and poisonous gas to be sucked in smoothly.

Figure 45:
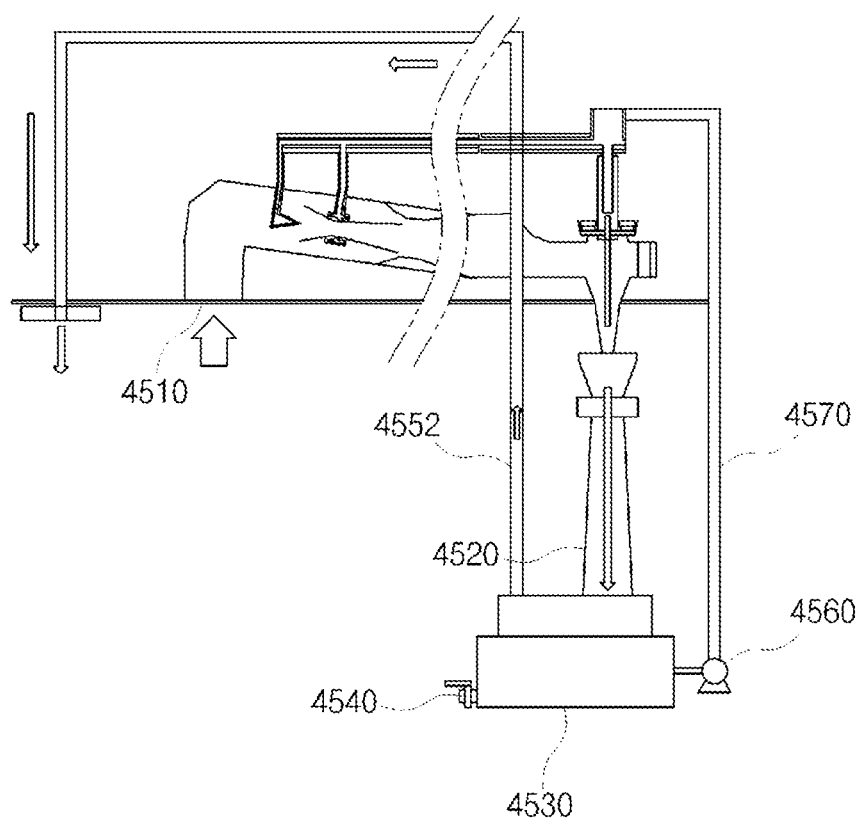
FIG. 45 illustrates smoke and poisonous gas removing apparatus according to another embodiment of the present invention, and illustrates an embodiment for reusing water by using a circulation pump.

FIG. 45 illustrates smoke and poisonous gas removing apparatus according to another embodiment of the present invention, and illustrates an embodiment for reusing water by using a circulation pump.

As illustrated in FIG. 45, water in a tank is circulated through a circulation pump 4560 and is resupplied along tube 4570, thereby saving water or drugs.

The smoke and poisonous gas removing apparatus of FIG. 45 may be provided as a mobile apparatus, which is simple, light and compact in size, at a passage or a suitable place through which smoke and poisonous gas are discharged when fire occurs.

The smoke and poisonous gas removing apparatus of FIG. 45 may have a simple structure which operates when water with certain pressure is supplied thereto. The smoke and poisonous gas removing apparatus is easily installed and disassembled, and thus, the user easily disassembles the smoke and poisonous gas removing apparatus in moving (evacuation), and installs and uses the smoke and poisonous gas removing apparatus at another place.

Moreover, in the smoke and poisonous gas removing apparatus according to the present embodiment, an external hold (installation) mobile apparatus is configured with a dedicated water tank and pump, and is provided at a passage (i.e., windows) through which smoke and poisonous gas are discharged, and water in the water tank is circulated and is used by designated fire engines to remove smoke and poisonous gas.

Discharged water is again placed in the tank of designated fire engines, and water passing through the filter is again supplied to the smoke and poisonous gas removing apparatus through the pump. This way, water in the water tank is continuously circulated.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. An apparatus for controlling smoke generated by fire, the apparatus comprising:
    a body configured to include a flux unit, which supplies water, and a nozzle which is connected to the flux unit and has a narrower width than the flux unit;
    a frame configured to surround the body, and include a suction part configured to suck the smoke generated by the fire;
    a heat sensitive unit fixed to seal the nozzle; and
    a multi-stage ring including a plurality of rings having different diameters, and positioned at a lower portion of the frame,
    wherein the plurality of rings overlap each other in a normal state, and when the fire occurs, the heat sensitive unit is dropped, and the plurality of rings are unfolded.

2. The apparatus of claim 1, wherein the frame is provided as a shape of a venturi tube in which a cross-sectional surface of a portion formed to surround the heat sensitive unit is narrowed and then is again broadened.

3. The apparatus of claim 1, further comprising a deflector configured to allow water, sprayed through the nozzle, to be sprayed on a broad area, wherein a largest-diameter ring of the plurality of rings included in the multi-stage ring is attached to the deflector.

4. The apparatus of claim 1, wherein,
    each of the plurality of rings included in the multi-stage ring has a bottle cap shape with an open top,
    in the normal state, the plurality of rings are separated from each other, and the rings other than a largest-size ring are overlapped in the largest-size ring in order of increasing size, and
    when the plurality of rings are unfolded, an end of each ring which serves as connection portion has creases of a bottle cap, then an upper portion of each ring is caught on creases of a ring just above each ring.

5. The apparatus of claim 1, further comprising a vortex generating unit included in the nozzle.

6. The apparatus of claim 1, wherein the nozzle is provided as two or more.

7. The apparatus of claim 1, further comprising a filter included in the suction part.

8. The apparatus of claim 7, wherein the filter is a spring filter.

9. The apparatus of claim 7, further comprising a dust box configured to collect pollutants collected by the filter.

10. The apparatus of claim 1, further comprising:
    an impeller included in the suction part, and configured to operate according to a movement of air sucked through the suction part;
    a small electricity generator configured to generate electricity by using a rotation of the impeller; and
    a lighting lamp adhered to the frame, electrically connected to the small electricity generator and configured to emit light according to the operation of the small electricity generator.

11. The apparatus of claim 1, further comprising:
    an impeller included in the flux unit, and configured to operate according to a movement of water supplied through the flux unit;
    a small electricity generator configured to generate electricity by using a rotation of the impeller; and
    a lighting lamp adhered to the frame, electrically connected to the small electricity generator and configured to emit light according to an operation of the small electricity generator.

12. The apparatus of claim 11, further comprising a water flow adjusting unit provided on the impeller included in the flux unit and configured to include a hole which allows the flow of water supplied to the flux unit to be changed to a rotating direction of the impeller.

13. The apparatus of claim 1, further comprising a tube connected to the suction part, and configured to extend from a space, in which the apparatus is provided, to another space to allow air to be sucked from the other space.

14. The apparatus of claim 1, wherein the apparatus is connected to a water supply pipe by using a quick coupler which automatically allows a supply of water to be stopped when the apparatus is removed.

15. The apparatus of claim 1, further comprising a vacuum unit provided in the body to surround the flux unit and the nozzle.

16. The apparatus of claim 1, wherein, when a fluid having a certain pressure is sprayed through the nozzle at high speed, pressure energy of the fluid is changed to velocity energy, and a vacuum state is formed in a suction room at a low pressure due to a fast speed,
wherein the suction part is provided at a position surrounding the nozzle, and
wherein the frame is provided to surround the heat sensitive unit.

17. A fire sprinkler comprising:
a nozzle connected to a pipe section which supplies water when fire occurs, and configured to spray the water supplied from the pipe section;
a mixing chamber in which the water sprayed through the nozzle is to be mixed with smoke that is generated by the fire; and
a multi-stage ring including a plurality of rings having different diameters, and positioned below the mixing chamber,
wherein the plurality of rings overlap each other in a normal state, and when the fire occurs, the plurality of rings are unfolded, and
wherein the mixing chamber has a venturi tube shape in which an area of a cross-sectional surface is narrowed in a center.

18. The smoke removing sprinkler of claim 17, wherein the mixing chamber is provided to have one or more spaces having the shape of a ring doughnut in the center, and the one or more spaces generate an eddy by using a vortex effect.

19. The fire sprinkler of claim 17, further comprising a vortex generating unit included in the nozzle.

20. The fire sprinkler of claim 17, further comprising a deflector provided under the mixing chamber to have a tetragonal structure, and configured to spray water on all corners of a tetragonal room, wherein a cross-sectional surface of the mixing chamber has a tetragonal shape.

21. The fire sprinkler of claim 17, wherein each of the nozzle and the mixing chamber is provided as two or more.

* * * * *